(12) United States Patent
Tryon, III

(10) Patent No.: US 8,027,820 B2
(45) Date of Patent: *Sep. 27, 2011

(54) METHOD AND APPARATUS FOR PREDICTING THE FAILURE OF A COMPONENT

(75) Inventor: Robert G. Tryon, III, Brentwood, CA (US)

(73) Assignee: Vextec Corporation, Brentwood, TN (US)

( * ) Notice: Subject to any disclaimer, the term of this patent is extended or adjusted under 35 U.S.C. 154(b) by 49 days.

This patent is subject to a terminal disclaimer.

(21) Appl. No.: 12/355,704

(22) Filed: Jan. 16, 2009

(65) Prior Publication Data

US 2009/0240646 A1 Sep. 24, 2009

Related U.S. Application Data

(63) Continuation of application No. 11/335,021, filed on Jan. 18, 2006, now Pat. No. 7,480,601, which is a continuation of application No. 10/002,316, filed on Oct. 25, 2001, now Pat. No. 7,016,825.

(60) Provisional application No. 60/243,880, filed on Oct. 26, 2000.

(51) Int. Cl.
G06G 7/48 (2006.01)

(52) U.S. Cl. .......................................... 703/7

(58) Field of Classification Search ................... 703/13, 703/7
See application file for complete search history.

(56) References Cited

U.S. PATENT DOCUMENTS

| | | | |
|---|---|---|---|
| 4,707,796 A | 11/1987 | Calabro et al. | |
| 4,766,595 A | 8/1988 | Gollomp | |
| 5,210,704 A | 5/1993 | Husseiny | |
| 5,331,579 A | 7/1994 | Maguire, Jr. et al. | |
| 5,465,321 A | 11/1995 | Smyth | |
| 5,736,645 A | 4/1998 | Chin-Chan et al. | |
| 5,764,068 A | 6/1998 | Katz et al. | |
| 6,085,154 A | 7/2000 | Leuthausser et al. | |
| 6,125,333 A | 9/2000 | Pun | |
| 6,212,485 B1 | 4/2001 | Nakano et al. | |
| 6,212,486 B1 | 4/2001 | Huang et al. | |
| 6,226,597 B1 | 5/2001 | Eastman et al. | |
| 6,246,011 B1 | 6/2001 | Abraham | |
| 6,301,970 B1 | 10/2001 | Biggs et al. | |
| 6,735,549 B2 | 5/2004 | Ridolfo | |
| 6,820,044 B2 | 11/2004 | Groen et al. | |
| 6,874,370 B1 | 4/2005 | Vachon | |
| 7,006,947 B2 | 2/2006 | Tryon et al. | |
| 7,016,825 B1 | 3/2006 | Tryon, III | |
| 7,480,601 B2 | 1/2009 | Tryon, III | |
| 7,505,885 B2 | 3/2009 | Deobald | |

OTHER PUBLICATIONS

Robert G. Tryon and Animesh Dey, "Reliability-based computational model for material development and structural design", 2001, International Journal of Materials & Product Technology, vol. 16, Nos. 4/5, pp. 333-357.*

(Continued)

*Primary Examiner* — Jason Proctor
*Assistant Examiner* — Russ Guill
(74) *Attorney, Agent, or Firm* — VLP Law Group LLP; Richard G. A. Bone

(57) ABSTRACT

The invention provides a method and apparatus for predicting the failure of a component using a probabilistic model of a material's microstructural-based response to fatigue. The method predicts the component failure by a computer simulation of multiple incarnations of real material behavior, or virtual prototyping. The virtual prototyping simulates the effects of characteristics that include grain size, grain orientation, micro-applied stress and micro-yield strength that are difficult to simulate with real specimens. The invention provides an apparatus for predicting the response of a component to fatigue using the method.

21 Claims, 23 Drawing Sheets

OTHER PUBLICATIONS

Dey, A. et al., "Finite element-based reliability analysis of composite structures", Advances in Computational Structural Mechanics Civil-Comp Press Edinburgh, UK, 1998, pp. 209-214.

Enright et al., Probabilistic Fatigue Life Sensitivity Analysis of Titanium Rotors, *American Institute of Aeronautics, SWI*, Jun. 2000, pp. 1-9.

Foulk, J. W., "Formulation of a three-dimensional cohesive zone model for application to a finite element algorithm", 2000, Computer methods in applied mechanics and engineering, vol. 183, pp. 51-66.

Kozaczek, K.J. et al., "Microstructural modelling of grain-boundary stresses in Alloy 600" Journal of Materials Science UK, vol. 30, No. 9, May 1, 1995, pp. 2390-2400.

Lanzagorta et al., "Three-Dimensional Visualization of Microstructures", *IEEE* 0-8186-9176-x/98, (1998).

McClung, R., "Fracture Mechanics Analysis in Darwin", (Dec. 1999), Southwest Research Institute, 4th Annual FAA/USAF workshop, pp. 1-22.

McDowell, D.L. Future Research Trends in Metal Plasiticity for Simulation of Metals Processing and Life Cycle Engineering Research Paper, Georgia Institute of Technology, (Sep. 1999).

McDowell, "Models for Small Fatigue Crack Growth Behavior," Georgia Tech Research Paper, Dec. 2000.

Murray, G. T., "Introduction to Engineering Materials", 1993, Taylor & Francis, pp. 175-185.

O'Brien et al., "Graphical Modeling and Animation of Brittle Fracture". *SIGGRAPH 1999, ACM 1999*.

Ostoja-Starzewski, M., "Random field models of heterogeneous materials" International Journal of Solids and Structures Elsevier UK, vol. 35, No. 19, Jul. 1998, pp. 2429-2455 XP002374886 ISSN: 0020-7683.

Smit et al., "Toughness of Heterogeneous Polymeric Systems, a Modeling Approach", Research Paper, Eindhoven University of Technology, ISBN 90-368-0750-4, Jun. 1998, 168 pages.

Smit et al, "Toughness of Heterogeneous Polymeric Systems, a Modeling Approach", Research Paper, Eindhoven University of Technology, ISBN 90-368-0750-4, Jun. 1998, 2 pages.

Tryon et al., "Probabilistic Mesomechanical Fatigue Model", Apr. 1997, NASA Technical Report 202342, all pages.

Tryon, R.G. et al., "Probabilistic Mesomechanics For High Cycle Fatigue Life Prediction" *Transactions Of The Asme. Journal Of Engineering Materials And Technology*, American Society of Mechanical Engineers, US, vol. 122, No. 2, (Apr. 2000), pp. 209-214 XP008062004 ISSN: 0094-4289.

Tryon, R.G. et al., "Reliability-Based Micromechanical Small Crack Growth Model" Collection of Technical Papers—AIAA/ASME/ASCE/AHS Structures, Structural Dynamics and Materials Conference, AIAA, Washington, DC, US, vol. 2, 15 (Apr. 1999), pp. 1197-1207 XP008062012 ISSN: 0273-4508.

Tryon, "Probabilistic Mesomechanical Fatigue Model", NASA Technical Report NASA/CR-97-202342, Apr. 1997, pp. 1-30.

Voyiadjis, G.Z. et al., "Multi-scale analysis of multiple damage mechanisms coupled with inelastic behavior of composite materials" Mechanics Research Communications Elsevier UK, vol. 27, No. 3, (May 2000), pp. 295-300 XP002374885 ISSN: 0093-6413.

Wu, Y-T et al., "An Efficient Methods for Reliability Analysis of Structures Subjected to In-Service Inspections", Jun. 1999. Proceedings of the 13th ASCE Engineering Mechanics Conference, 6 pages.

Wu, Y-T et al, "Efficient and accurate Methods for Probabilistic Analysis of Titanium Rotors", Jul. 24-25, 2000, 8th ASCE Specialty Conference on Probabilistic Mechanics and Structural Reliability, six pages.

PCT/US0150933 international Search Report, mailed Jul. 11, 2002, 7 pages.

PCT/US0150933 Supplementary Partial European Search Report (4 pages), dated Apr. 19, 2006.

PCT/US0150933 Supplementary Partial European Search Report (5 pages), dated Oct. 12, 2006.

Tryon et al., "A Reliability-Based Model to Predict Scatter in Fatigue Crack Nucleation Life", Fatigue & Fracture of Engineering Materials & Structure, 21:257-267 (1998).

Tryon et al , "Probabilistic Mesomechanical Fatigue Crack Nucleation Model", Journal of Engineering Materials and Technology, 119:65-69 (Jan. 1997).

Golden, et al., "Probabilistic Fretting Fatigue Life Prediction of Ti-6Al-4V", Air Force Research Laboratory Report No. AFRL-RX-WP-TP-2010-4058, (Jan. 2010).

Riha, et al., "Probabilistic Engineering Analysis Using the Nessus Software", American Institute of Aeronautics and Astronautics, Report No. AIAAA-2000-1512 (2000).

Thacker et al., "Probabilistic engineering analysis using the NESSUS software", Structural Safety 28, 83-107, (2006).

* cited by examiner

Section A-A

METHOD AND APPARATUS FOR PREDICTING THE FAILURE OF A COMPONENT

CROSS-REFERENCE TO RELATED APPLICATIONS

This application is a continuation of U.S. application Ser. No. 11/335,021, filed on Jan. 18, 2006 (U.S. Pat. No. 7,480, 601), which is a continuation of U.S. application Ser. No. 10/002,316, filed Oct. 25, 2001 (U.S. Pat. No. 7,016,825), which claims priority to U.S. Provisional Application Ser. No. 60/243,880, filed Oct. 26, 2000, the entire contents of which are hereby incorporated by reference.

ACKNOWLEDGEMENT

This invention was made with Government support under F33615-00-C-5209 awarded by the United States Air Force. The Government may have certain rights in this invention.

TECHNICAL FIELD

This invention relates to a method and apparatus for predicting failure of a component. More specifically it relates to a method and apparatus for predicting failure of a component using a microstructure-based fatigue model developed using probabilistic methods.

BACKGROUND OF THE INVENTION

Ever increasing economic demands require that components and structures have high reliability. It is usually the case that similar components experience large variations in their total life. For example, one machine element may last many years, yet another element produced by the same manufacturer may fail in a few months. Traditional design methods account for large uncertainty or scatter in life by using design safety factors. Low probabilities of failure can usually be ensured only by applying large safety factors during component design. But safety factors can add unnecessary redundancy, weight, and cost to a component because the true safe life of the component may be much greater than the predicted safe life. Furthermore, to ensure safety, components are often retired well before the useful lifetime is exhausted to insure that no component fails during operation (i.e. Aircraft parts). Designing cost effective and highly reliable structures and maximizing part life therefore requires the ability to accurately assess a component's safe life.

Assessing a component's safe life often requires determining the effects of fatigue on a component. Fatigue can occur in any device that has moving components. Fatigue can also occur in cases where the movement is imperceptible as do, for example, bridge elements or railroad tracks. Components also often fail in an insidious manner, giving no prior indication that damage has occurred. In the case of an aircraft engine, for example, such fatigue failures can be catastrophic.

Failure analysis has revealed that actual component loadings are often well below the steady loads that can cause failure. What distinguishes these failures is the fact that the loads have been applied a large number of times. Fatigue, more specifically fatigue crack initiation and growth, is therefore a damage mechanism that degrades the reliability and safe life of components subjected to repeated loads. Designing for fatigue is difficult because it typically exhibits a large variation in its effect on similar components.

In the case of fatigue failure, scatter in life is indicated by a coefficient of variation (COV) which is usually determined based on a wide range of fatigue life tests on many similar specimens. Even under well controlled laboratory tests of annealed smooth specimens at room temperature the COV varies from less than 10% to over 500% for different steel alloys. Thus, the considerable scatter in the fatigue reliability of components in operation may be substantially attributed to considerable scatter of component material fatigue behavior.

Life scatter is due to the fact that, in general, materials have inhomogeneous microstructures. To the naked eye, it may appear that a material is composed of continuous homogeneous material. Microscopic examination reveals, however, that metals, for example, are comprised of a discontinuous inhomogeneous material consisting of individual crystalline grains, pours, and defects. Cracks nucleate and grow on the order of grain size according to the properties of the individual grains, with growth rate as varied as grain properties. As these cracks grow the rate and behavior of the crack approaches the bulk or average properties of the material. Therefore, for large cracks, traditional crack growth methods are appropriate. Traditional methods, however, fail to determine the probability of crack initiation or to describe crack growth of near-grain-sized cracks. In many applications failure can occur before the fatigue damage reaches the long crack stage because the energy associated with the damage is very high although the damage is very small.

Current fatigue life prediction methods in metallic components consider three stages: crack initiation, long crack propagation, and final fracture. Long crack propagation and final fracture are stages of damage accumulation that are well characterized using computational models such as linear elastic or elastic-plastic fracture mechanics.

Crack initiation is the early stage of damage accumulation characterized by small cracks; cracks with depths less than several grain diameters. These have been observed to deviate significantly from predicted long crack fracture mechanics. The deviation is attributed to the heterogenous material in which small cracks evolve. The crack initiation phase accounts for the majority of scatter in fatigue life for many alloys. The crack initiation stage contains two phases: crack nucleation and small crack growth.

Crack nucleation is a locally complex process of crack formation on the microstructural scale. One example of a crack nucleation mechanism is the smooth fracture at angles inclined to the loading direction that is exhibited by materials having a propensity for planar slip. Crack growth is the similarly complex process that occurs once a crack has been nucleated.

Current crack initation models are based on empirical testing. This causes crack initiation models to be simple parametric functions of applied stress variables. As such, these macrostructural models assume the material to be homogeneous and continuous. Statistical concepts have been used to develop empirical fatigue life models where the independent variable, usually applied global stress or strain, is considered deterministic and the dependent variable, usually life, is considered random. But these models do not account for the mechanisms of the microstructural parameters that regulate fatigue damage. Since this major source of scatter (i.e. microstructural crack initiation, which includes both crack nucleation and small crack growth) is not included in these models, they are necessarily unsatisfactory because they cannot represent the heterogeneous material in which the damage processes occur.

Because traditional crack initiation models are empirical, they cannot represent conditions not included in the established database test program. Sequential variation is one such condition. Sequential variation is due to the component being used for many different scenarios. For example, an automobile is driven differently during each trip and an unlimited number of sequential variations would have to be considered. While current long crack growth propagation models are able to account for sequential variation in the component usage, it is not practical from a time and cost standpoint to include sequential variations in the applied stress under most test programs. Therefore crack initiation tests are generally conducted at a maximum i.e., "worst case", stress to ensure safety. Thus components are generally systematically overdesigned assuming unlikely worst case material properties to compensate for the lack of true understanding of the material fatigue behavior. Additionally, these traditional models are unsatisfactory for predicting individual component failure because the vast majority of components by definition do not possess these unlikely worst case material properties. Predictions made using such models are based upon the worst case material properties and are thus inaccurate.

FIG. 1 depicts three levels of fatigue damage that may occur in a typical high strength component. First, a crack nucleates 200 on a small scale on the order of the grain size. Then the crack grows as a microscopically small crack 202 in which the crack lies in relatively few grains. The material properties, averaged along the front of the crack, approach bulk or average material properties as the crack grows and the number of grains intercepted by the crack front increase. When the material properties intercept enough grains traditional crack growth techniques such as linear elastic fracture mechanics 204 may be applied. But the majority of crack life is spent in the nucleation and small crack growth regime for high strength components. Thus, understanding the early crack behavior is most important. As a result, there exists a need for a method and apparatus for accurately predicting component failure that account for the microstructural properties of materials and sequential variation in the loading, and relate them to fatigue scatter.

BRIEF SUMMARY OF THE INVENTION

This invention provides a method for predicting the failure of a component. A preferred embodiment of the method comprises obtaining a Finite Element Model (FEM) of the component; analyzing the FEM to obtain stresses at its nodes; identifying a subset of the nodes as significant nodes based on the stresses; determining a Representative Volume Element (RVE) for the significant nodes; developing an RVE microstructure-based failure model for the RVEs; simulating a component life using RVE microstructure-based failure models to produce a result related to the component life; performing the simulating a plurality of times to produce results related to the component life; preparing statistics using the results; and comparing the statistics to a probability of failure (POF) criteria to determine whether the performing predicted failure for the component.

The invention also provides an apparatus for predicting the failure of a component. A preferred embodiment of the method comprises a central processing unit (CPU); an output device for displaying simulated fatigue results; an input device for receiving input; and a memory comprising: instructions for receiving input comprising a component's material characteristics; instructions for using RVE microstructure-based failure models and the input and predicting failure of the component, the predicting comprising: simulating a component using at least one RVE microstructure-based failure model, the simulating producing a result related to component life; performing the simulating a plurality of times to produce results related to component life; preparing statistics using the results; and comparing the statistics to a probability of failure (POF) criteria to determine whether the performing predicted failure for the component; and instructions for displaying a result from the predicting.

In addition the invention provides a method for determining the orientation factor for a grain slip system of a material comprising: obtaining equations that relate a stress direction to a material's potential slip systems; simulating a grain orientation of the material, the simulating comprising: using probabilistic methods to generate a slip plane normal angle for each of the potential slip systems; inputting the normal angle into the equations to obtain a potential orientation factor for each of the potential slip systems; and selecting the least of the potential orientation factors as a grain orientation factor for the simulated grain orientation; repeating the simulating for a defined number of grains and obtaining a plurality of grain orientation factors; and creating a statistical distribution of the plurality of grain orientation factors to determine an orientation factor for the grain slip system.

Finally the invention provides an apparatus for determining the orientation factor for a grain slip system of a material comprising: a central processing unit (CPU); an output device for displaying simulated fatigue results; an input device for receiving input; and a memory comprising: instructions for receiving input; instructions for simulating a grain orientation of the material, the simulating comprising: relating a stress direction to a material's potential slip systems with equations; using probabilistic methods to generate a slip plane normal angle for each of the potential slip systems; inputting the normal angle into the equations to obtain a potential orientation factor for each of the potential slip systems; and selecting the least of the potential orientation factors as a grain orientation factor for the simulated grain orientation; instructions for repeating the simulating for a defined number of grains and obtaining a plurality of grain orientation factors; and instructions for creating a statistical distribution of the plurality of grain orientation factors to determine an orientation factor for the grain slip system.

BRIEF DESCRIPTION OF THE SEVERAL VIEWS OF THE DRAWINGS

The foregoing and other aspects and advantages of the present invention will be better understood from the following detailed description of preferred embodiments of the invention with reference to the drawings, in which.

Like reference numerals refer to corresponding elements throughout the several drawings.

DETAILED DESCRIPTION OF THE INVENTION

The present invention uses a virtual prototyping technique that relies on computer simulation of real material behavior to predict when a component will fail due to fatigue. The fatigue life of a component is recognized to be a characteristic property of the material of which the component is composed. A component is made up of an ensemble of discrete microscopic structural elements of a material such as grains, colonies, and nodules. Many different materials are composed of such discrete microscopic structural elements, such as metals, intermetallics, ceramics, and some plastics. The method of the invention is aimed at predicting the variation in fatigue life based on the statistical variation of the microscopic structural of the material. Material parameters at metallic grain level are used along with fundamental physics-based models to predict the damage as it accumulates from the nucleation of cracks, through small crack growth and long crack growth, to final failure.

Figure 1:
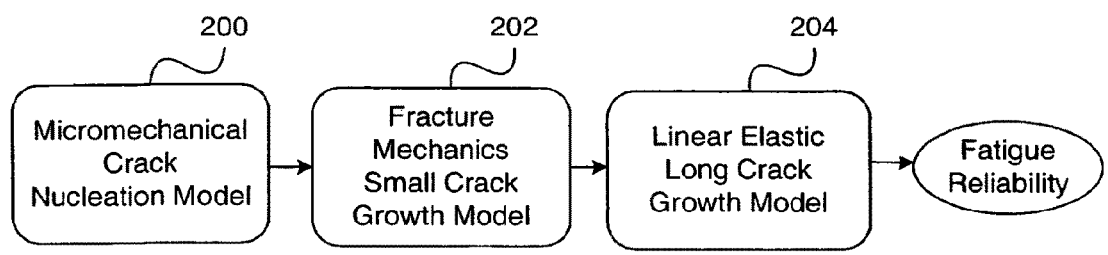
FIG. 1 illustrates three levels of fatigue damage in a high strength component.
Figure 2:
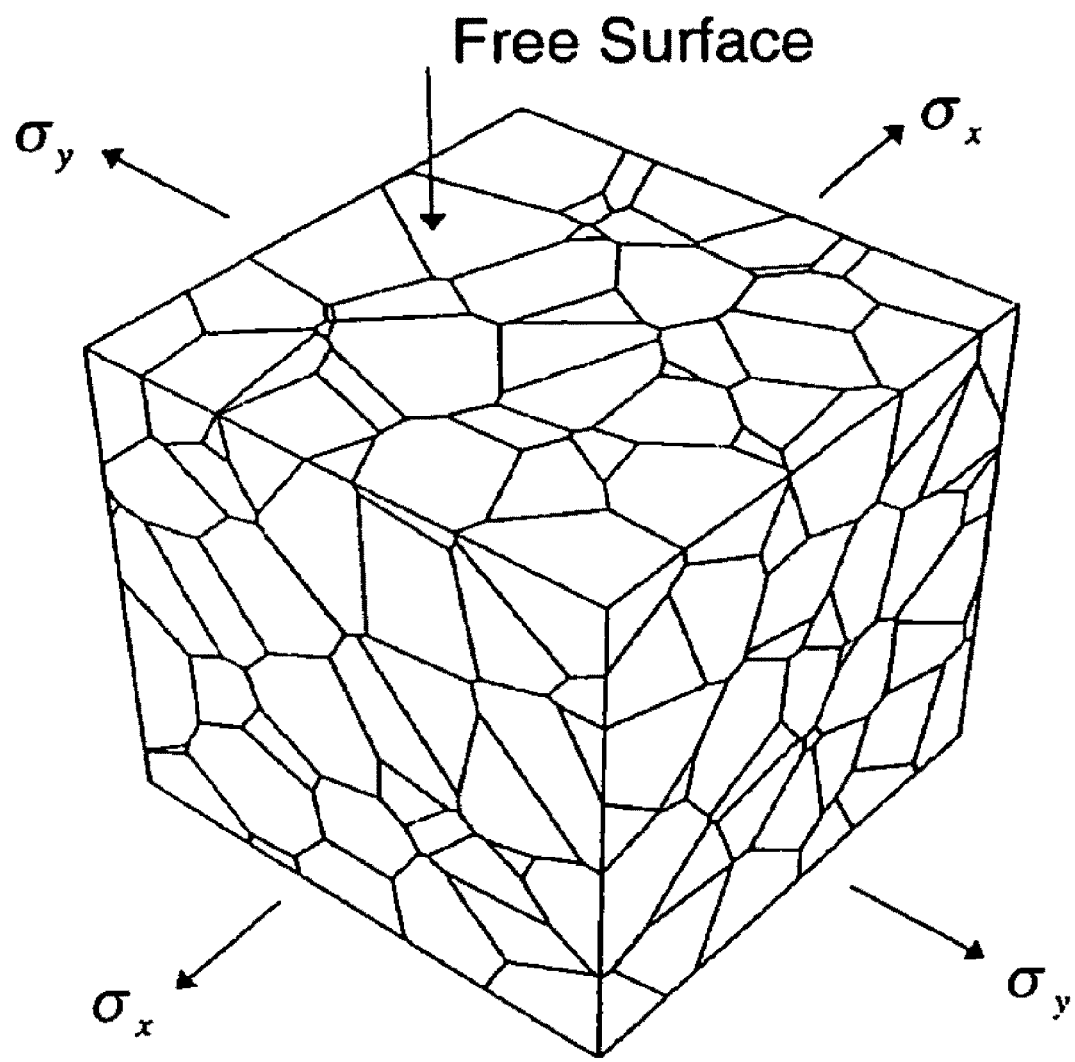
FIG. 2 is a microscopic view of a metallic structure showing grains of various shapes and sizes.

The computer simulates many "identical" components but uses a different sample of material microstructure for each simulation. The microscopic structure of each simulated material model or "realization" for each component is properly sampled from the known or specified range of material microstructures. Each of the elements is then virtually tested using computer simulation to simulate real-world usage conditions. The virtual testing allows data to be produced quickly on thousands or even millions of components. This virtual testing addresses variation in the microscopic substructure, illustrated in FIG. 2, by modeling the grain size, grain orientation, micro-applied stress and micro-yield strength as random. These parameters are then used in modeling crack nucleation and small crack growth. All of the variation in the long crack growth is simulated by the variability in crack growth rate coefficient.

Preferred embodiments of the present invention use probabilistic analysis methods to address the effects of the random nature associated with material microstructure, loading, and manufacturing differences, assuming that the underlying physics of the component behavior are deterministic and that the random nature of the component response is attributed to the variability in the input to the component and the parameters defining the failure physics.

Figure 3A:
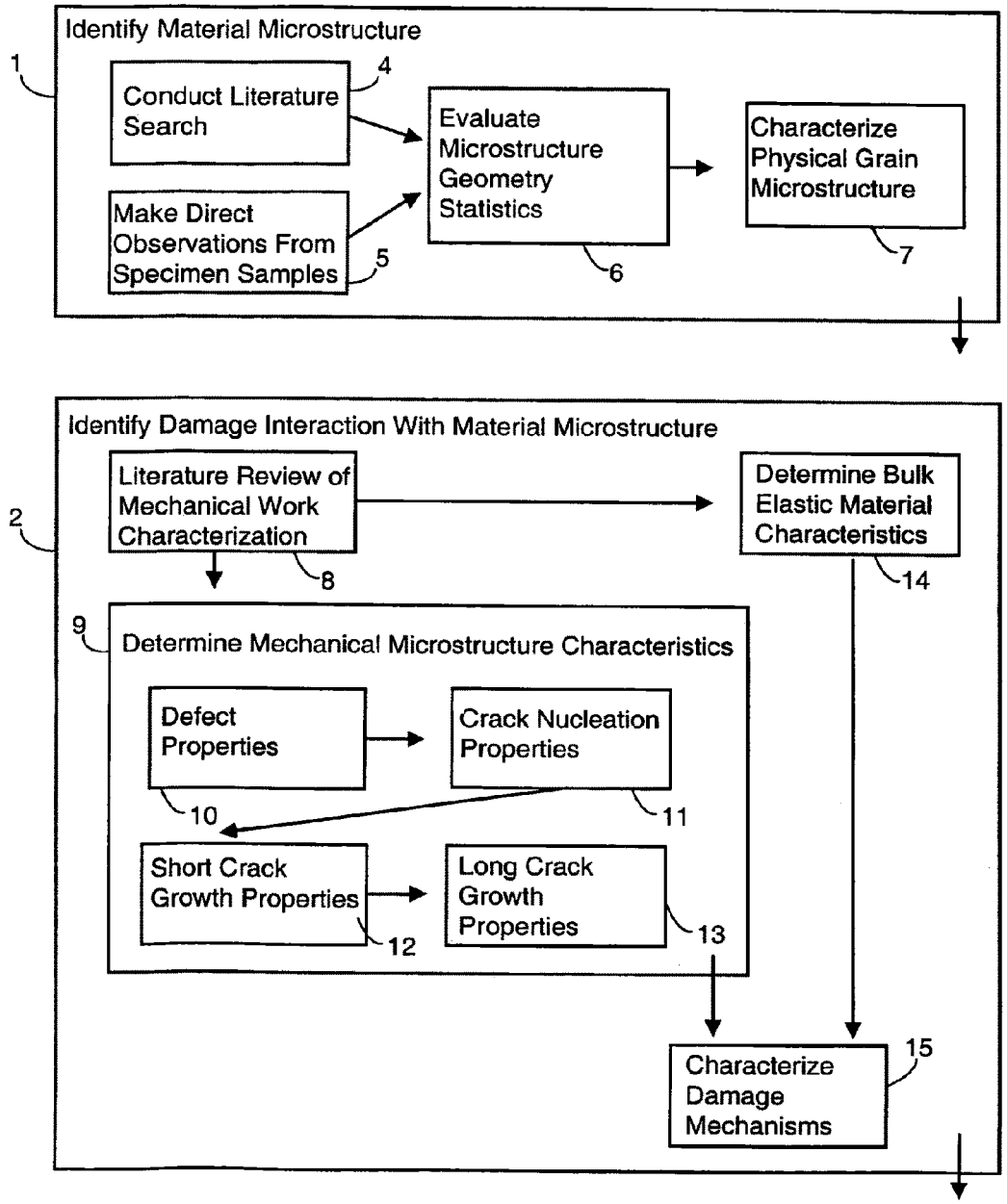
FIGS. 3(a)-3(e) depict a flowchart of a preferred embodiment of a method of the invention.
Figure 3B:
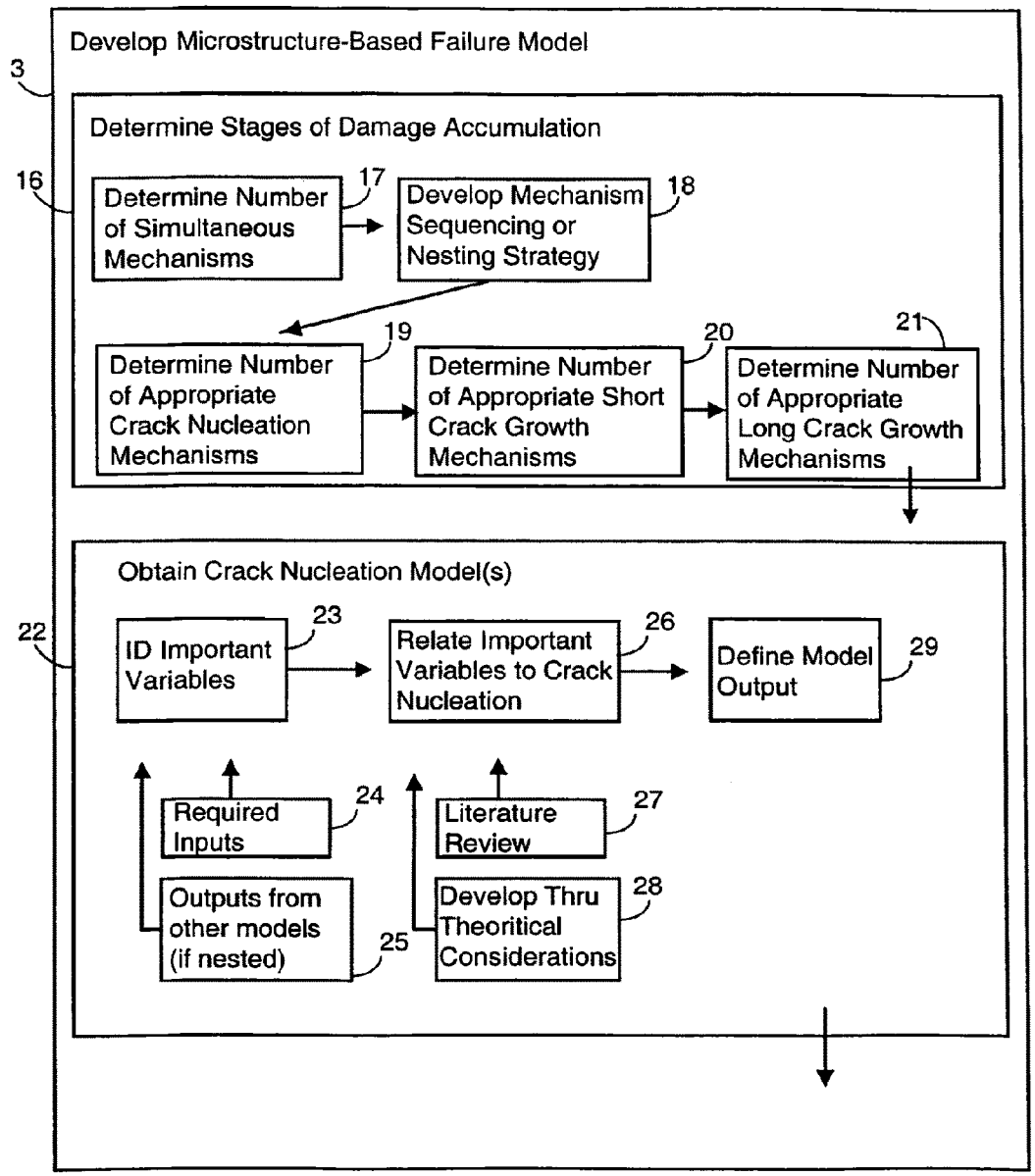

Now referring to FIGS. 3(a)-3(e), which contain a flowchart of a preferred embodiment of a method of the invention, the method generally includes identifying the material microstructure 1, identifying the damage interaction with the material microstructure 2, and developing a microstructure-based failure model 3 (FIG. 3b).

Referring to FIG. 3(a), identifying the material microstructure 1 includes: conducting literature search 4; making direct observations about a materials microstructural arrangement based on specimen samples 5; and evaluating microstructure geometry statistics 6 based on the literature search and direct measurements of specimens. These statistics will vary depending on the material and microstructural arrangement but this will usually include grain size, orientation, and volume fraction estimates. Identifying the material microstructure 1 culminates with characterizing the physical grain microstructure 7.

Identification of the damage interaction with the material microstructure 2 includes processes necessary to characterize active damage mechanisms 15 that become the basis of microstructure-based failure model development 3 (FIG. 3(b)). First a literature review 8 is undertaken to determine if information exists about either the bulk elastic material characteristics 14 or the mechanical (i.e. loaded) microstructural characteristics 9. Defect properties assessment 10 then defines grain slip planes, pores, or inclusions which are likely to cause local plastic deformation. There are a wide variety of other potential defects within any given material. Crack nucleation properties 11 defines the mechanisms that cause local plastic deformation to nucleate cracks. Short crack growth properties 12 then defines the active mechanisms at the short crack tip that govern the erratic behavior of short cracks, such as grain boundary blockage, grain orientation, and the local frictional strength. Long crack growth properties 13 defines crack growth rate parameters as well as threshold characteristics. Determining bulk elastic material characteristics 14 encompasses a number of properties including: shear modulus, Poisson's ratio, and specific fracture energy; although the appropriate properties vary greatly depending upon the material and microstructural arrangement. Then, after determining bulk elastic material characteristics 14 and mechanical microstructure characteristics 9 it is possible to characterize the damage mechanisms 15.

Figure 3C:
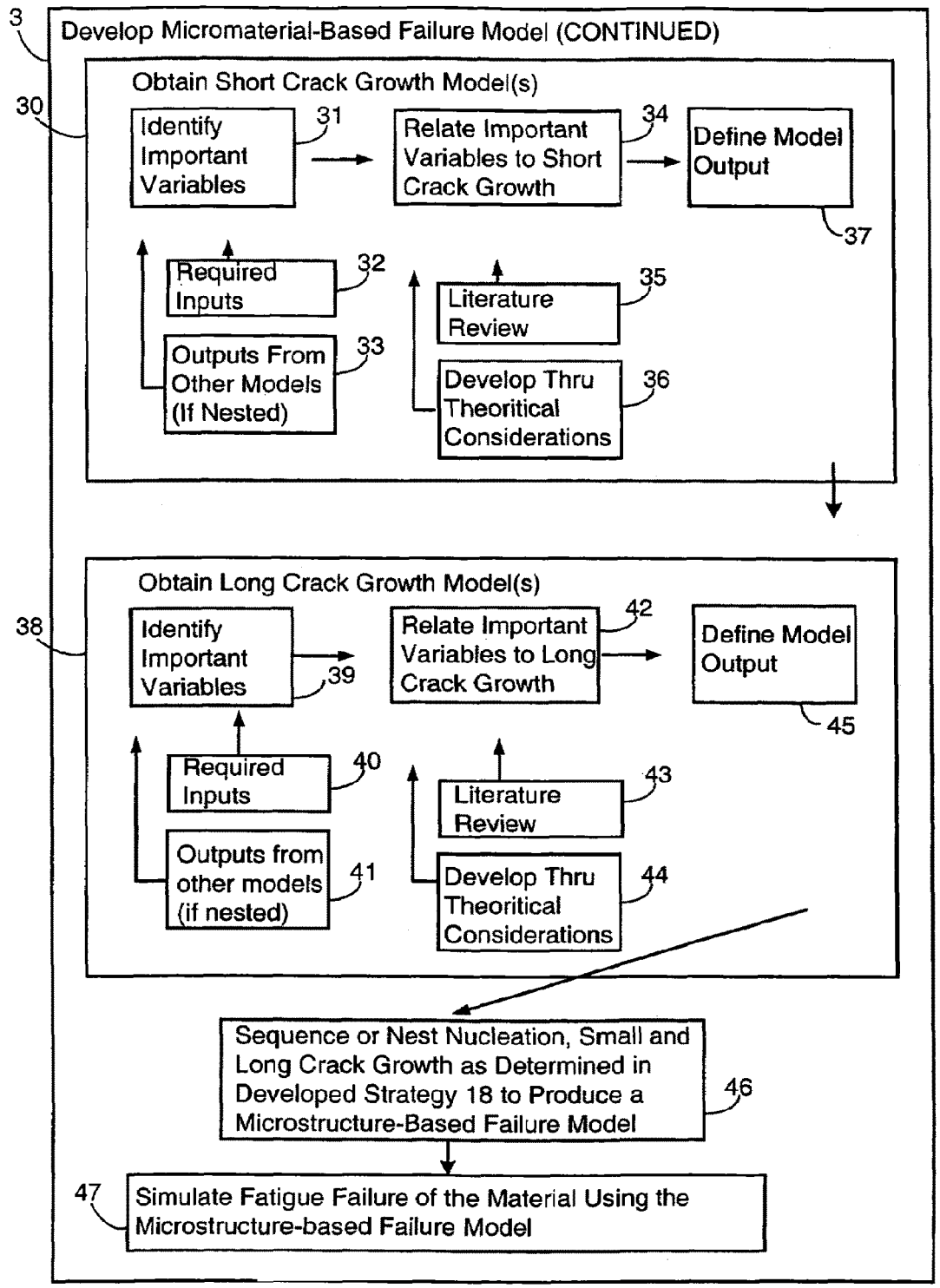

Now referring to FIG. 3(b), development of the microstructure-based failure model 3 is generally accomplished by determining the stages of damage accumulation 16, developing crack nucleation models 22, developing short crack growth models 30 (FIG. 3(c)), developing long crack growth models 38 (FIG. 3(c)), and linking (i.e. sequencing and/or nesting) the crack nucleation, short crack growth, and long crack growth models to produce an overall failure model 46 (FIG. 3(c)).

Determining the stages for damage accumulation 16 begins by determining the number of simultaneous damage mechanisms 17 that exist (i.e. ductile nucleation in one phase occurring simultaneously with brittle nucleation in a second phase). Then a mechanism sequencing or nesting strategy 18 is developed that, in general, links these models. Linking is needed to predict the fatigue response at the component level because fatigue damage can start at a very small scale and grow to final fracture. The lower level model uses the appropriate parameters to determine the initial state of the next level. The next level uses the results from the previous level along with the appropriate parameters specific to its level to determine the initial state of the next level and so on. Through the use of these "nested" modeling techniques, component reliability can be linked to the physical mechanisms at each level. Additionally, by modeling each level of the fatigue process individually, and rigorously linking the levels, various size effects are included. Next make an evaluation as to the number of nucleation models 19, short crack growth models 20, and long crack growth models 21 required. Each of the mechanisms characterized 15 (FIG. 3(b)) will have a corresponding model. Multiple models may be needed for each level due to multiple mechanisms for each damage level, and different mechanisms may be active simultaneously 17.

Next develop the crack nucleation models 22 determined appropriate for the mechanisms of damage accumulation 19. First, identify the important random variables 23 based on the required model inputs 24, or outputs 25 from other models (should the nucleation model be nested). Then relate the important variables to crack nucleation 26 through literature review 27 and development through theoretical considerations 28. Crack life and crack cycles are similar concepts when discussed regarding fatigue failures. Finally, define model output 29 (parameters that could also serve as inputs to other models at the next level).

Now referring to FIG. 3(c), develop the short crack growth models 30 determined appropriate 20. The method is analogous to developing the crack nucleation models 22. Identify important random variables 31 based on required model inputs 32 or outputs from other models 33 (in the case where the short crack growth model is nested). Then relate the important variables to short crack growth 34 through literature review 35 and development through theoretical considerations 36. Finally, define model output 37 (parameters that could also serve as inputs to other models at the next level).

Similarly, develop the long crack growth models 38 determined appropriate 21. Identify important random variables 39 based on required model inputs 40 or outputs from other models 41 (in the case where the long crack growth model is nested). Then relate the important variables to long crack growth 42 through literature review 43 and development through theoretical considerations 44. Finally, define model output 45.

After developing the appropriate models, these nucleation, short crack, and long crack growth models are sequenced or nested 46 following the strategy developed 18 (FIG. 3(b)) to produce the overall microstructure-based failure model.

Microstructure-based failure model 46 is limited to a single microstructure and single loading conditions. Most real-world components will have many material microstructural arrangements and, more likely than not, experience multiple loading conditions. Now referring to FIG. 3(d), to apply the method to a real-world component, develop or obtain a conventional Finite Element Model (FEM) 48. Then analyze the FEM and obtain the stress at each node 50. With these stresses, identify the significant nodes 52. Significant stresses could be those above material fatigue strength or to a safety factor applied to fatigue strength as determined by one of ordinary skill in the art. Around these significant nodes develop a Representative Volume Element (RVE) 54. An RVE is a finite region of the FEM that has a consistent stress. The information for each RVE should include the stress on the RVE, the dimensions, and the properties and microstructure of the material within the RVE. Determine the microstructures within each RVE and apply the process of FIGS. 3(a)-3(c) to each RVE 56 to obtain an overall microstructure-based failure model 46 (FIG. 3(c)) for each RVE. At some point prior to beginning the first simulation of the component, identify a probability of failure (POF) convergence criteria 58 for the eventual statistics that describe the simulated component fatigue failures 80 (FIG. 3(e)). The necessary statistical significance will be different for different situations.

The component is simulated by using the overall microstructure-based failure model developed for each RVE 56. First establish the density of potential nucleation sites within each RVE using the probabilistic-based Monte Carlo (MC) method 62. Then establish the number of potential nucleation sites within each RVE using MC 64. The use of MC methods for establishing the number and density of potential nucleation sites is documented within the open literature.

Next determine the cycles to failure for each potential nucleation site 66. First use MC methods to establish values for each of the random variables 68 in the overall failure model 46 (FIG. 3(c)) for the potential nucleation site in question. The appropriate set of those values is input into the microstructure-based failure model for the potential nucleation site in question 70 to determine the cycles to failure for that site 72. The process is repeated for each potential nucleation site within the RVE 72 and the "life" of the RVE is established 74. The life of the RVE is the smallest number of cycles to failure for any of the included potential nucleation sites.

Figure 3D:
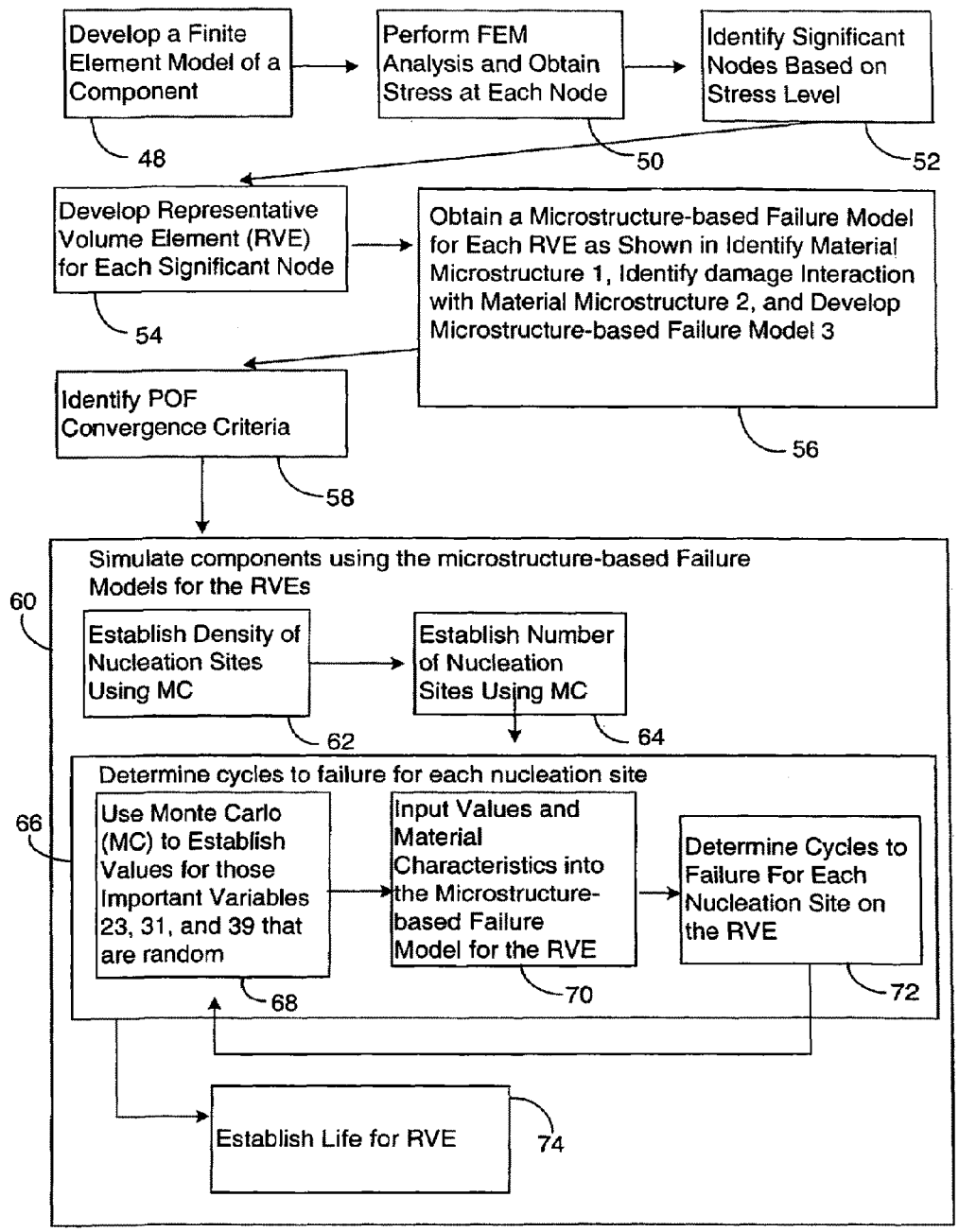
Figure 3E:
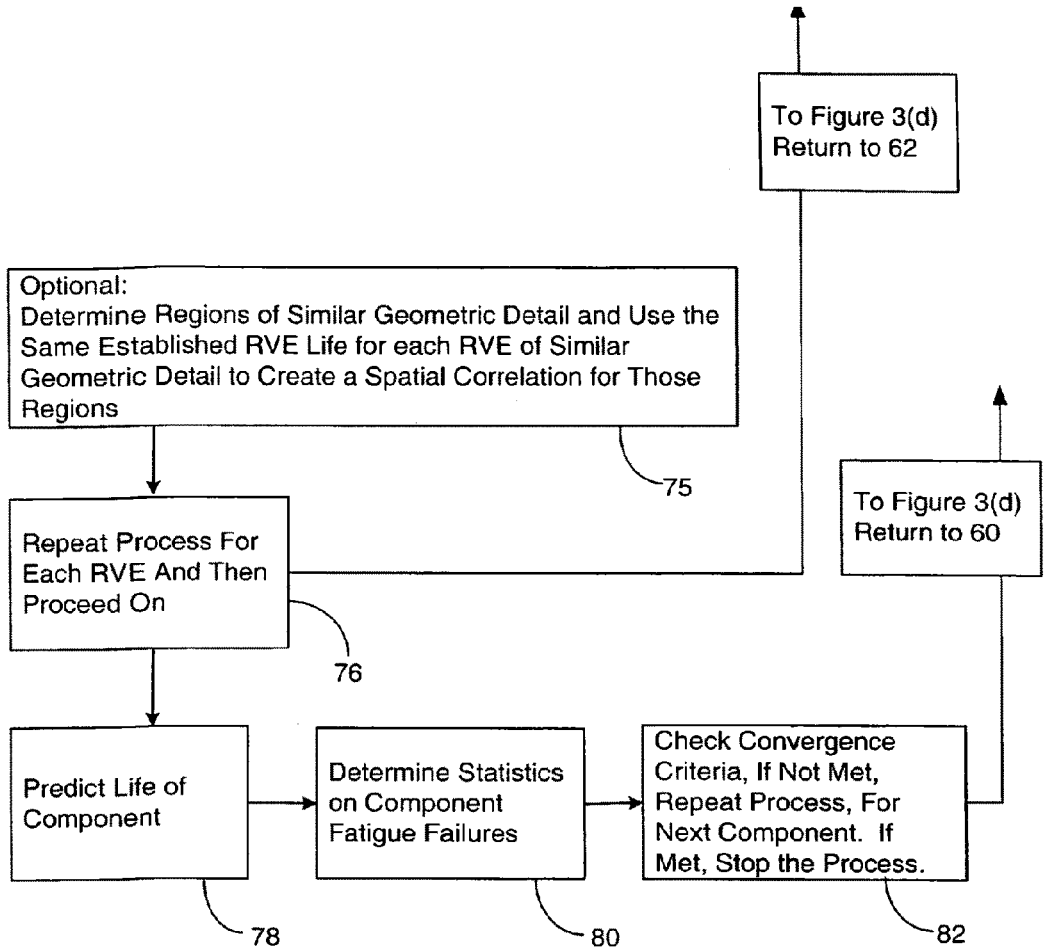

Now referring to FIG. 3(e), repeat simulating the component 60 (FIG. 3(d)) for each RVE 76 in this simulated component. The predicted life of this component 78 is the minimum number of cycles to failure for any RVE. Include this result with any previous predictions and determine the statistics on these component fatigue failures 80. For example the statistics could include a POF, a cumulative distribution function (CDF), or a probability density function (PDF) of failure characteristics. One of ordinary skill in the art will recognize that the desired component statistics will vary considerably based on the problem at hand. Next, check the statistics against the POF convergence criteria 82 and, if not met, return to simulate another component failure 60 and repeat the process.

Should the RVE be so large that computer analysis of every potential nucleation site would be cumbersome, a modification can be made to the process. Step 66 would be modified to evaluate only a statistically significant number of potential nucleation sites and probabilistic methods (also called system reliability methods) would be used to estimate RVE life 74, rather than directly computing the shortest life of each potential nucleation site.

Another aspect of the invention is that it can be modified to account for an FEM that accounts for variation in stress and/or dimension. Here, step 50 is modified so the FEM analysis results in a statistical distribution of stresses rather than a single value of stress. This statistical distribution of stresses may be found experimentally, or developed using any number of probabilistic methods. Then in step 68, stress will also be one of the random variables whose value is established using MC analysis, also a probabilistic method.

Still another modification of the invention adds a spatial correlation to the FEM. This correlation is beneficial when a component has multiple locations, of similar geometric detail. An optional step finds the fatigue life for regions of the component with similar geometric detail 75, repeats the process for each RVE 76 and then determines the component fatigue life based in part on a spatial correlation from the information gained from step 75. The spatial correlation comes from using a common established life for the RVE 74 whenever encountering an RVE that is one of the group having similar geometric detail. This may lead to the use of the various probabilistic methods to calculate component life (based on the particular circumstances). An RVE may, in fact, only be two dimensional, but it is nevertheless referred to as a volume element.

The probabilistic method used in determining cycle to failure for each nucleation site 66, providing values for random variables 62 (FIG. 3(d)), 64, 68, and estimating RVE fatigue life 74 include Fast Probability Methods (FPM) and Simulation Methods (ST). FPM techniques include response surface FPM and direct FPM. Direct FPM methods will always provide a solution, but when a response surface may be used its use can increase the efficiency of the prediction calculations. A response surface, however, cannot be formed when considering variables that vary with time and, thus, present discontinuities. Direct FPM are then necessary, although such variables may possibly be handled using multiple nested response surface equations, a single response surface equation will not suffice.

Other potential FPM approaches include First Order Reliability Methods (FORM), Second Order Reliability Methods (SORM), Advanced Mean Value (AMV) methods, and Mean Value (MV) methods. Potential ST approaches include Monte Carlo (MC) and importance sampling. MC methods are used in this preferred embodiment of the invention for simulating components using the microstructure-based failure models for the RVEs 60.

Figure 4:
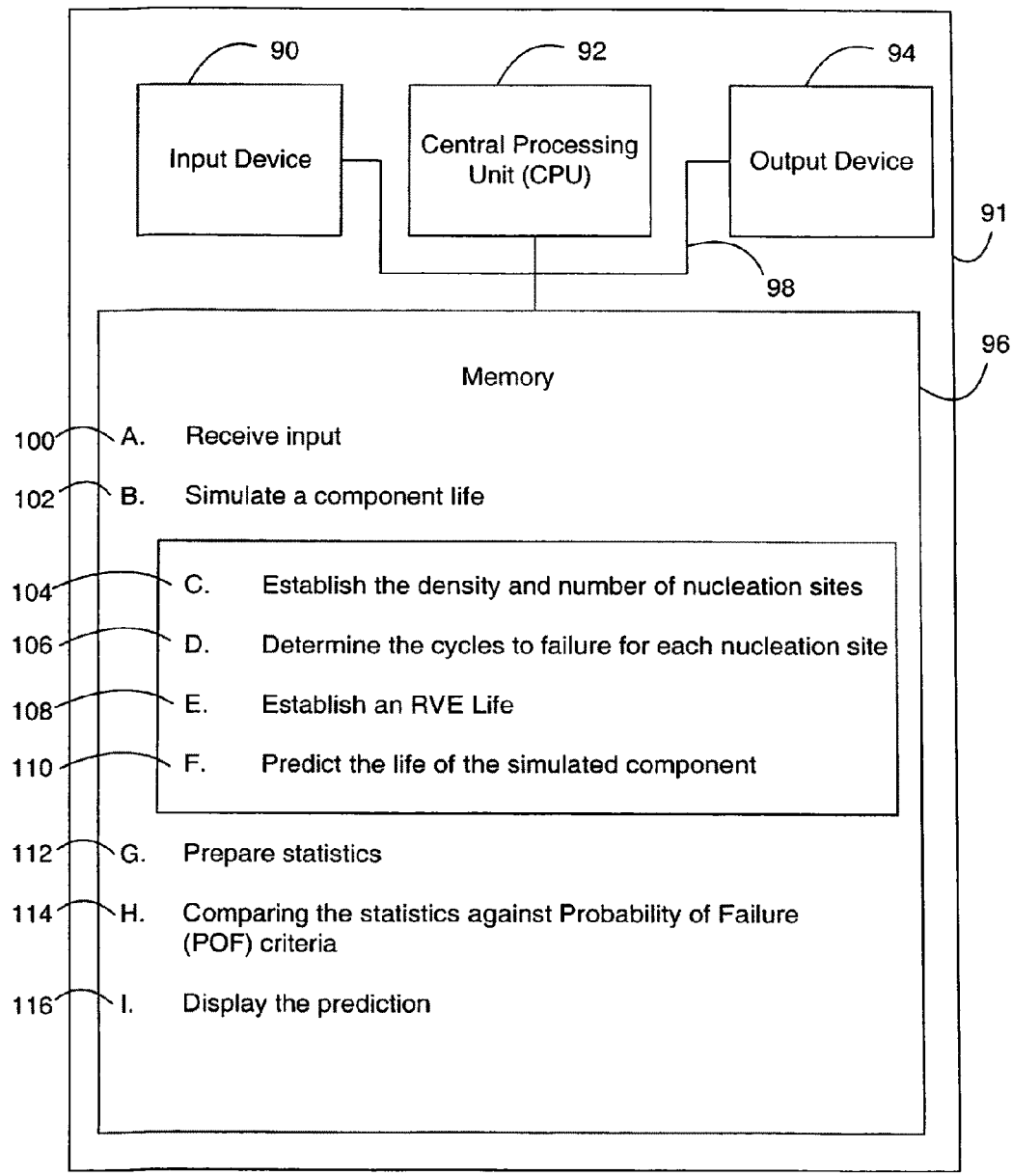
FIG. 4 is a diagram of an apparatus for predicting the failure of a component that incorporates a preferred embodiment of the present invention.

Now referring to FIG. 4, which is a diagram of an apparatus for predicting the failure of a component that incorporates a preferred embodiment of the present invention, apparatus 91 generally includes an input device 90, a central processing unit (CPU) 92, an output device 94, a bus 98, and a memory 96. Memory 96 contains instructions for receiving input 100, simulating a component life 102, preparing statistics 112, and displaying the prediction 116. Input 100 contains the component's material characteristics and values for other variables necessary to predict failure, such as the number of components to simulate, etc. Simulating a component life 102 entails using a micro-structure-based failure model to simulate the life of RVEs by establishing the density and number of nucleation sites within an RVE 104, determining the cycles to failure for each nucleation sites within the RVE 106, establishing an RVE life 108 for each RVE based on the cycles to failure for each nucleation site, and predicting the life of the simulated component 110 based on the established RVE lives. Once that prediction is made for that single simulated component, that prediction is added to the group of any previous component life predictions and statistics prepared 112 to describe the group of predictions. These statistics are compared 114 to a previously input Probability of Failure (POF) criteria, and if not met another component life is simulated 102. If the POF criteria are met then the prediction is displayed 116.

Another cause of the large scatter in the fatigue response is the limited ductility caused by the ordered microstructure that constrains plastic slip deformation to a limited number of crystallographic directions. Describing the slip behavior is essential to developing computational material models that predict mechanical properties such as fracture, fatigue, and creep behavior. The present invention provides a method for statistically describing the grain orientation factor for slip. Deformation is strongly orientation dependent for many high strength alloys. With the method of the present invention, the orientation dependence of the deformation can be described statistically and probabilistic microstructure-based models can be used to predict the scatter in the macrostructural material response such as fatigue.

Figure 5:
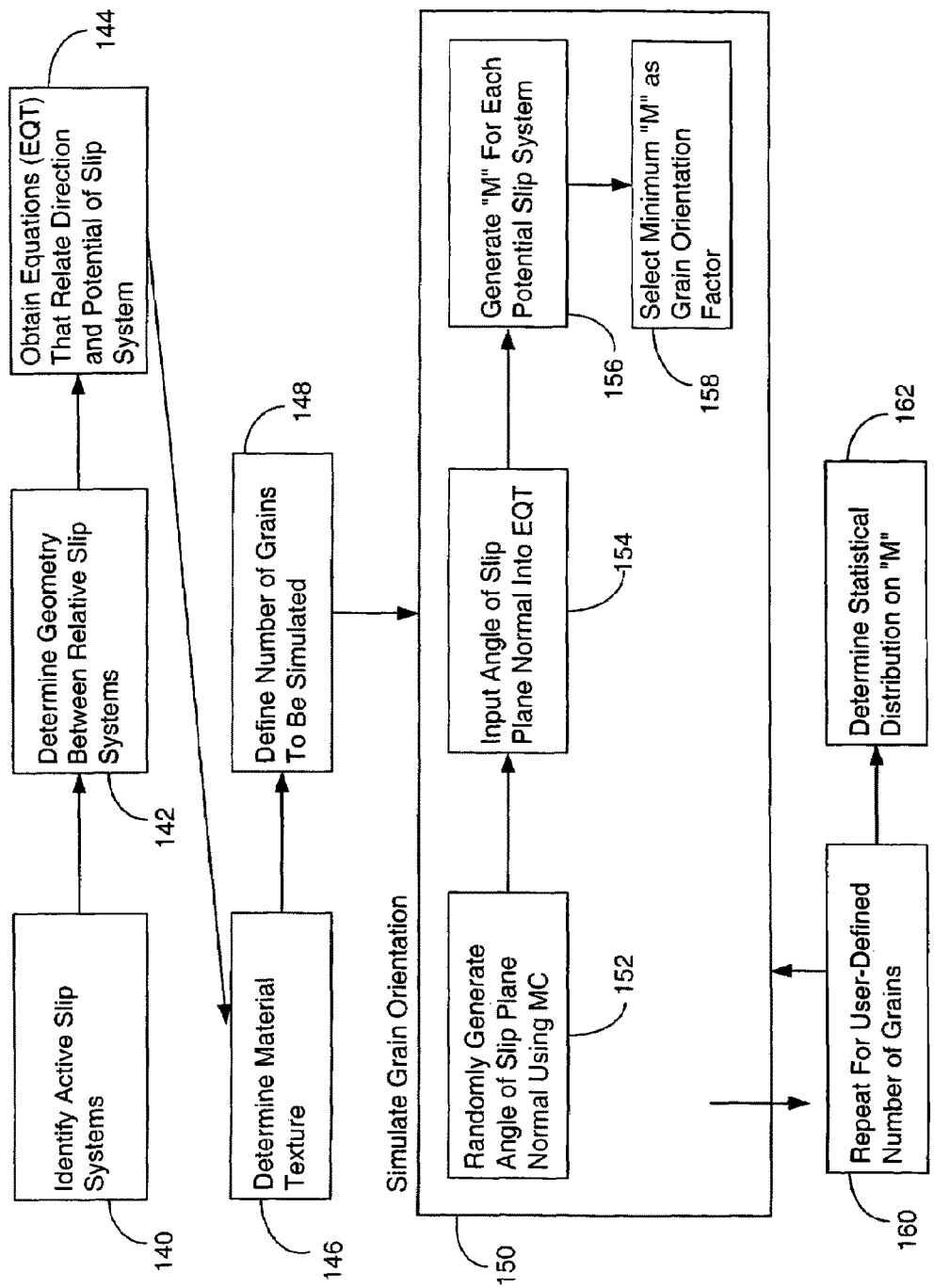
FIG. 5 depicts a flowchart of preferred embodiment of a method of the invention for determining a grain orientation factor.

Now referring to FIG. 5, which contains a flowchart of preferred embodiment of a method of the invention for determining a grain orientation factor, the first step is to identify the active slip systems 140. Then the geometry between relative slip systems is determined 142 to obtain equations that relate direction and potential of the slip systems 144. Next the material texture is determined 146 and the number of grains to be simulated defined 148. If a material is untextured it implies that it exhibits a uniformly random grain orientation. Simulating grain orientation 150 includes randomly generating an angle of slip plane normal using MC 152, inputting the generated angle of slip plane normal into equations (from step 144) 154 to generate an orientation factor ("M") for each potential slip system 156. The minimum orientation factor generated is selected as the grain orientation factor for this simulated grain 158. Simulating grain orientation 150 is repeated for the user-defined number of grains 160 to obtain a grain orientation factor for each simulated grain. These grain orientation factors are statistically analyzed to predict the grain orientation factor for the material 162.

Figure 6:
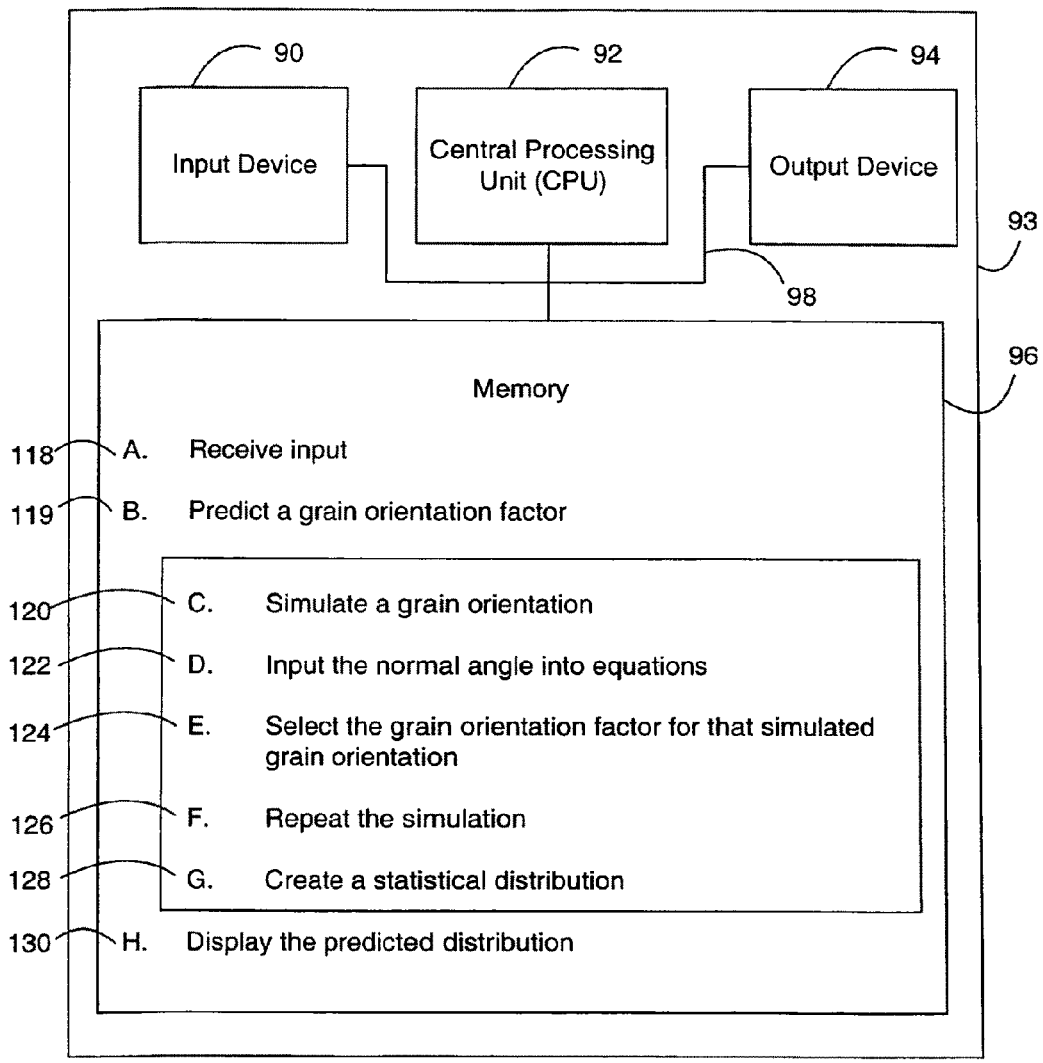
FIG. 6 is a diagram of an apparatus for determining the orientation factor for a grain slip system that incorporates a preferred embodiment of the present invention.

Now referring to FIG. 6, which is a diagram of an apparatus for determining the orientation factor for a grain slip system that incorporates a preferred embodiment of the present invention, apparatus 93 generally includes an input device 90, a central processing unit (CPU) 92, an output device 94, a bus 98, and a memory 96. Memory 96 generally contains instructions for receiving input 118, predicting a grain orientation factor for the slip system 119, and displaying the prediction 130 of the distribution of the grain orientation factors for the slip system. Predicting a grain orientation factor for the slip system 119 in turn includes simulating a grain orientation 120 of a material in question by using probabilistic methods to generate a slip plane normal angle for each potential slip system, inputting the normal angle into equations 122 that relate the directions of the potential slip systems to obtain a potential orientation factor for each potential slip system, selecting the minimum potential orientation factors 124 as the grain orientation factors for that simulated grain orientation, repeating the simulation 126 of the grain orientation for a defined number of grains and obtaining a grain orientation factor from each simulation, and creating a statistical distribution 128 of the grain orientation factors to determine the orientation factor for the grain slip system.

The principals of the present invention are further illustrated by the following examples. These examples describe possible preferred embodiments for illustrative purposes only, they do not limit the scope of the invention as set forth in the appended claims.

EXAMPLE 1

Figure 7:
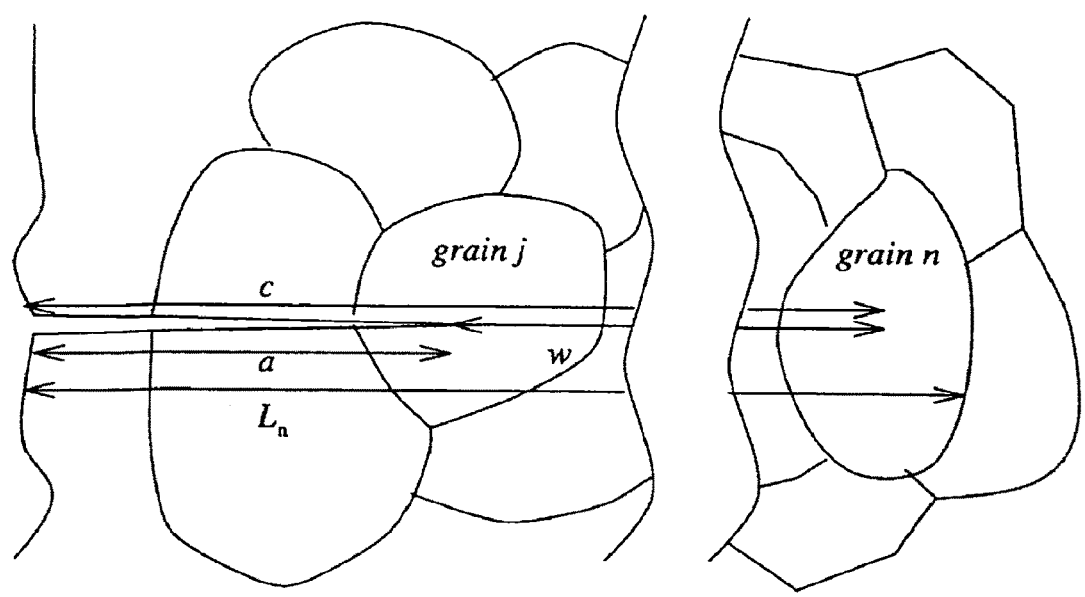
FIG. 7 depicts a crack tip slip band in multiple grains in Example 1.
Figure 8:
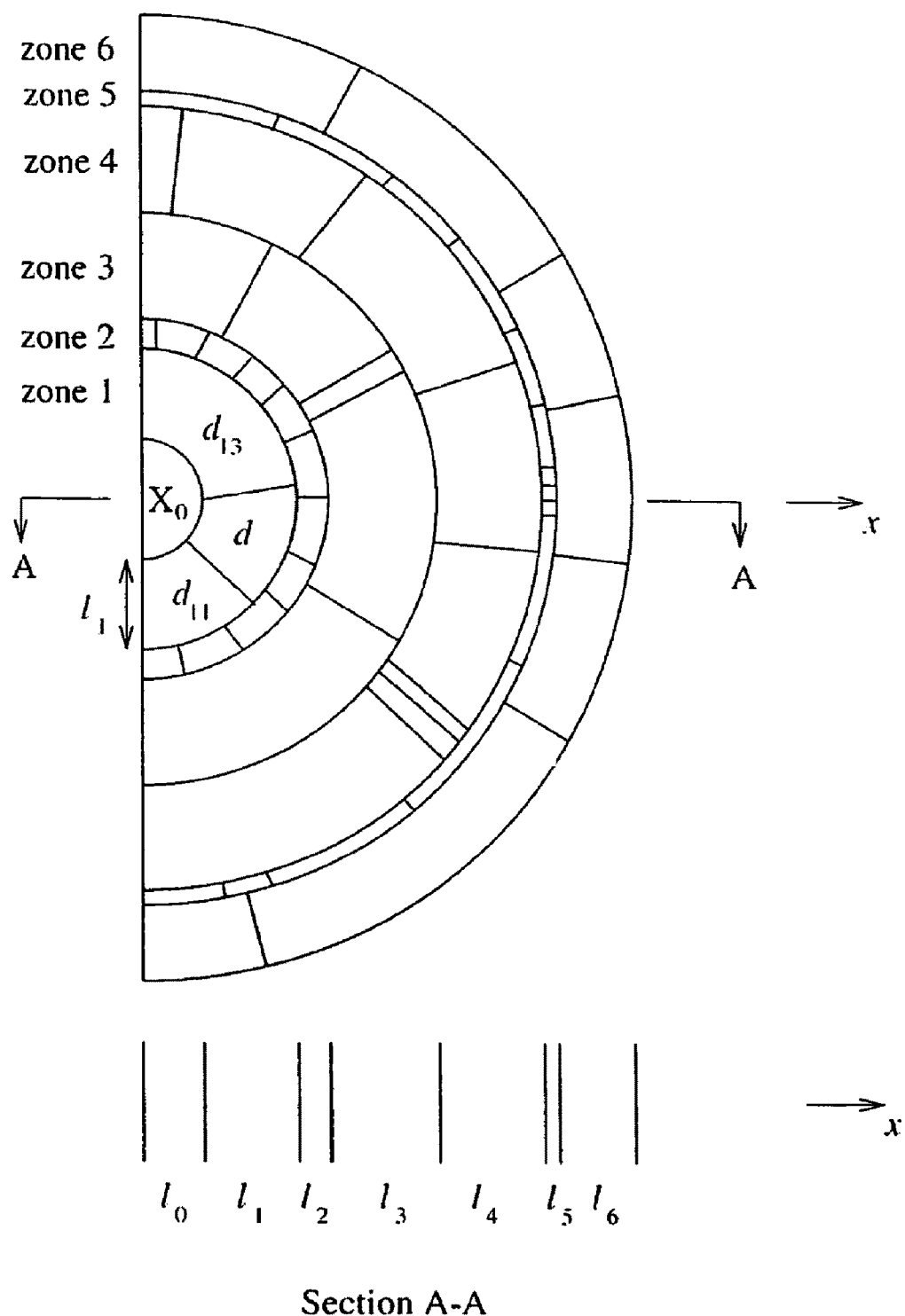
FIG. 8 depicts a random microstructure generated by a Monte Carlo simulation in Example 1.

The following example applies the method of the present invention to a γ prime-strengthened nickel superalloy to derive a microstructure-based fatigue failure model and is illustrated by FIGS. 7 and 8. It also reflects the numbering and methods of FIGS. 3(*a*)-3(*e*) throughout. The example is applicable to the general class of nickel superalloys. The discrete microscopic structural elements of a material were identified 1 through literature search 4 and direct microscopic observations 5. Through literature search 4 it was determined that the alloy was face center cubic single phase with polycrystalline grains. For this example, no direct observations of specimen samples 5 were required. Information in the literature was used to estimate the statistics defining the geometry of the microstructure 6 as characterized 7 by the values in Table 1 for the grain diameter, slip orientation of surface grains, and slip orientation of interior grains.

TABLE 1

Characterization of the physical microstructure.

| Variable | Description | Distribution Type | Distribution Parameters | | Average | COV |
|---|---|---|---|---|---|---|
| d | Grain diameter | Lognormal | λ = −0.076 | ζ = 0.39 | 0.005 in | 0.40 |
| $M_S$ | Schmid Orientation Factor | | Curve Fit | | 2.21 | 0.08 |
| $M_T$ | Taylor Orientation Factor | | Curve Fit | | 3.07 | 0.13 |

Identifying the interaction of the fatigue damage with the material microstructure 2 started with literature review 8. Dislocation moving on slip planes and pinning at the grain boundaries served as the initial defects 10 to accommodate plastic deformation. Crack nucleation 11 was determined to occur when the accumulated dislocations exceeded the materials specific fracture energy. The crack may not grow, i.e. the crack growth may arrest, depending of the size of the crack and the applied load.

The short cracks were determined to grow 12 by emitting dislocations from the crack tips along the slip planes of the grains ahead of the short crack. The dislocation movement caused a zone of plastic deformation at the crack tip. The zones propagated freely if the crack tip was far from a grain boundary. As the crack tip approached a grain boundary the zone pinned at the grain boundary. The crack may not grow into the next grains depending on the size of the plastic zone. The size of the plastic zone was dependent on the crack size, the applied load, and the size, orientation and strength of the grains surrounding the plastic zone. The crack was considered a short crack until the crack is of sufficient size such that the crack tip intercepted sufficient grains to assume bulk properties. Long crack growth 13 was described using conventional methods based on linear elastic fracture mechanics as is typical in the open literature. Review of the literature 8 identified suitable bulk elastic material properties 14 from empirical microstructural studies reporting bulk properties.

The microstructural fatigue failure model 3 was determined based on the observations of the damage interaction with the microstructure 2. Because the example material was single phase and the only defects were dislocations accumulating on naturally occurring slip planes, no mechanisms acted simultaneously 17. The linking strategy 18 was that the crack nucleated within a grain, then the crack grew as a short crack until it reached sufficient size, then the crack grew as a long crack. A single model was used for crack nucleation 19. Two models were used for short crack growth 20. One short crack model was used when the slip band tip was free to propagate and the other when the slip band tip was blocked by a grain boundary. A single model was used for long crack growth 21.

The crack nucleation model 22 was used to determine the number of cycles needed to crack the grain. The crack nucleation size was set to be equal to the grain size. The important variables 23 governing the crack nucleation were: W, the plastic energy cause by the $i^{th}$ fatigue cycle; G, the shear modulus; τ, the local applied stress; k, the frictional stress which must be overcome to move dislocations; v, Poisson's ratio; d, the grain diameter; σ, the local applied normal stress; $W_s$, the specific fracture energy per unit area; and M, the orientation factor. For this example, all the important variables were required inputs 24 there were no outputs 25 from other models.

An example of a crack nucleation model that related the important variable to the crack nucleation cycles and size 26 for a planar slip driven metallic grain was developed from theoretical considerations 28 as well as literature review 27 and was described mathematically in Equation 1:

$$W_i = \frac{\left(\frac{\Delta\sigma}{M} - 2k\right)^2 \pi(1-v)d}{4G} \quad \text{Eq. (1)}$$

The plastic energy was found for each cycle and total plastic energy for each grain was the summation of the plastic energy from each cycle and described by Equation 2:

$$W_T = \sum_{i=1}^{Q} W_i \quad \text{Eq. (2)}$$

where $W_T$ is the accumulated fracture energy for Q cycles. The number of cycles needed to nucleate a crack the size of the grain was determined to be when $W_T$ exceeded $W_s$. The variables, which may have had significant local variation, were: $W_s$, σ, M, k, and d. The output 29 from the crack nucleation model was $N_n$, the number of cycles needed to grow a crack to the size of the grain.

The short crack growth model 30 was used to determine the number of cycles needed to grow the crack from the initiation size until traditional long crack growth mechanics 38 could be assumed. The important variables 31 governing the crack nucleation were: $\phi_t$, the crack tip opening displacement (CTOD); and C', an experimentally determined coefficient. The CTOD was a function of the applied load and the microstructural parameters surrounding the crack tip such as: G, the shear modulus; k, the frictional stress which must be overcome to move dislocations; ν, Poisson's ratio; d, the grain diameter; σ, the local applied normal stress; $W_s$, the specific fracture energy per unit area; and M, the orientation factor. These important variables were required inputs 32. One other important variable, an output from other models 33, was $a_n$, the crack size at the end of the crack nucleation period.

An example of a short crack growth model that related the important variable to the short crack growth cycles and size 34 for a planar slip driven metallic grain was developed from theoretical considerations 36 as well as literature review 35 and was described mathematically as follows in Equation 3, assuming a simple linear relationship between the short crack growth rate and the CTOD:

$$\frac{da}{dN} = C'\Delta\varphi_t \qquad \text{Eq. (3)}$$

where: a was the crack size; N was the number of cycles; C' was an experimentally determined coefficient; and $\varphi_t$ was the CTOD. The CTOD was predicted based on the interaction of the crack tip plastic zone with the microstructure. The crack size at any number of cycles Q was defined 37 by Equation 4:

$$a_Q = a_n + \sum_{i=1}^{Q} da_i \qquad \text{Eq. (4)}$$

where $a_n$ was the crack size at the end of the crack nucleation period.

An example of a CTOD model for a planar slip driven metallic grain was described mathematically as follows. Considering a crack with the crack tip in the $j^{th}$ grain and the slip band tip in the $n^{th}$ grain as shown in FIG. 7. If the slip band was propagating (not blocked by the grain boundary), the size of the slip band zone could be found from Equation 5:

$$0 = \frac{\pi\tau_j}{2} - k_j \arcsin\frac{a}{c} - \sum_{i=J+1}^{n}\left[\frac{(\tau_{i-1}-k_{i-1})-}{(\tau_i-k_i)}\right]\arcsin\left(\frac{L_{i-1}}{c}\right) \qquad \text{Eq. (5)}$$

where: $\tau_i$ was the applied resolved shear stress in the $i^{th}$ grain; $k_i$ was the frictional stress of the $i^{th}$ grain; a was the crack length; c was the crack plus slip band length; and $L_i$ was the distance from the free surface to the grain boundary of the $i^{th}$ grain preceding the slip band tip as shown in FIG. 7.

The CTOD was defined by Equation 6:

$$\phi_1 = \frac{2k_j a}{\pi^2 A}\ln\frac{c}{a} + \sum_{i=j+1}^{n}\frac{(\tau_{i-1}-k_{i-1})-(\tau_i-k_i)}{\pi^2 A}g(a;c,L_{i-1}) \qquad \text{Eq. (6)}$$

$$g(a;c,L_{i-1}) = L\ln\left|\frac{\sqrt{c^2-L^2}+\sqrt{c^2-a^2}}{\sqrt{c^2-L^2}-\sqrt{c^2-a^2}}\right|$$

$$= a\ln\left|\frac{\sqrt{c^2-L^2}+\sqrt{c^2-a^2}}{\sqrt{c^2-L^2}-\sqrt{c^2-a^2}}\right|$$

$A = G/2\pi(1-\nu)$ for edge dislocations $A = G/2\pi$ for screw dislocations

For the blocked slip band, the size of the slip band zone was defined by Equation 7, the CTOD defined by Equation 8, and the microscopic stress intensity factor at the slip band tip by Equation 9.

$$\omega = L_n - a \qquad \text{Eq. (7)}$$

$$\phi_t = \frac{\beta\tau}{\pi A}\sqrt{c^2-a^2} + \frac{2k_j a}{\pi^2 A}\ln\frac{c}{a} + \sum_{i=j+1}^{n}\frac{(\tau_{i-1}-k_{i-1})-}{\pi^2 A}g(a;c,L_{i-1}) \qquad \text{Eq. (8)}$$

$$\beta = 1 - \frac{2k_j}{\pi\tau_j}\arccos\frac{a}{c} - \sum_{i=j+1}^{n}\frac{2\left[\begin{array}{c}(\tau_{i-1}-k_{i-1})-\\(\tau_i-k_i)\end{array}\right]}{\pi\tau_j}\arccos\left(\frac{L_{i-1}}{c}\right)$$

$$K_m = \beta\tau\sqrt{\pi c} \qquad \text{Eq. (9)}$$

To account for the crystallographic orientation of the individual grains, the applied resolved shear stress τ in Eq. 5 through 9 was replaced with:

$$\tau = \frac{\sigma}{M_S} \text{ for surface gains}$$

$$\tau = \frac{\sigma}{M_T} \text{ for interior gains}$$

where σ was the local normal applied stress, $M_S$ was the reciprocal Schmid factor and $M_T$ was the Taylor factor.

Predicting the CTOD using Eq. 6 or 8 required determining the microstructural properties along the crack path. Considering a random array of grains as shown in FIG. 8, these properties were determined to be as follows. A crack nucleated in the surface grain $X_0$ and then grew as a semi-circle through zones in which the effective material properties were uniform. The boundaries of the zones were represented by the concentric half circles. The zones were composed of grains represented by the semi-circular segments. The arc length of the semi circular segments was a random variable equal to the grain diameter. The surface grains were represented by the intersection of the zones and the surface.

After successful crack nucleation, the crack grew from grain $X_0$ into zone 1. In the example shown in FIG. 8, zone 1 contains three grains. The surface length 11 of zone 1 is the simple arithmetic average of the grain diameters shown by Equation 10.

$$l_1 = \frac{d_{11}+d_{12}+d_{13}}{3} \qquad \text{Eq. (10)}$$

The effective material property $P_{1eff}$ of zone 1 is the average of the properties of the individual grains $P_{1i}$ weighted with the area of the grain. $P_{1eff}$ represents the local frictional strength k or the local applied stress, σ, and is shown as Equation 11.

$$P_{1eff} = \frac{P_{11}d_{11}^2 + P_{12}d_{12}^2 + P_{13}d_{13}^2}{d_{11}^2 + d_{12}^2 + d_{13}^2} \qquad \text{Eq. (11)}$$

In the $n^{th}$ zone composed of j grains, the surface length is given by Equation 12 and the effective material property by Equation 13. As the crack becomes long, l approaches the mean grain size and $P_{eff}$ approaches the bulk properties.

$$l_n = \frac{\sum_{i=1}^{j} d_{ni}}{j} \qquad \text{Eq. (12)}$$

$$P_{neff} = \frac{\sum_{i=1}^{j} P_{ni} d_{ni}^2}{\sum_{i=1}^{j} d_{ni}^2} \qquad \text{Eq. (13)}$$

Using the concepts of effective material properties, crack growth was modeled as one-dimensional. Considering a cut along the x-axis (Section A-A in FIG. 8), the fatigue damage was modeled as a one-dimensional crack growing through zones of varying size $l_n$ and varying effective material properties $P_{eff}$.

After determining the material properties along the crack path the CTOD was determined using Eq. 6 or 8. Eq. 3 was used to determine the incremental crack growth with each application of loading N. The output of the short crack growth model 37 was the short crack growth life (the number of cycles for the crack to growth through the microstructure of FIG. 8) and the short crack size $l_i$.

The long crack growth model 38 was used to determine the number of cycles needed to grow the crack from the short crack size until crack reached the critical crack size. The important variables 39 governing the crack nucleation were: C, the Paris coefficient; n, the Paris exponent; $\Delta\sigma$, the globally applied stress range; and $\beta$, the shape factor ($1.12\sqrt{\pi}$ for a half penny shaped crack). These important variables were required inputs 40. Another important variable, an output from other models 41, was $a_{sc}$, the crack size at the end of the short crack growth period.

An example of a long crack growth model for a planar slip driven metallic grains was described mathematically using a model from the literature 43. In this case no additional theoretical considerations 44 were required. The incremental crack growth rate in the long crack growth stage was calculated using Paris law and is given by Equation 14, with the crack size at any number of cycles given by Equation 15.

$$\frac{da}{dN} = C(\beta\Delta\sigma)^n \qquad \text{Eq. (14)}$$

$$a_Q = a_{sc} + \sum_{i=1}^{Q} da_i \qquad \text{Eq. (15)}$$

The output 45 from the long crack growth model was the Ng, the long crack cycle to reach the critical crack size.

The overall failure model 46 was produced by summing number of cycles for the three phases namely, crack nucleation, short crack growth, and long crack growth.

EXAMPLE 2

The following example applies a preferred embodiment of the method of the present invention to predicting fatigue failure of a bolt hole using probabilistic microstructure-based models using Finite Element Method (FEM) results. It reflects the numbering of FIGS. 3(a)-3(e) throughout and is further illustrated using FIGS. 9-13. This example illustrates the development of methods to model geometrically complex components with complex stress distributions and predict the failure of the component. The output from typical FEM analyses are used to find the elastic global stress at each node 50 of the FEM model. The macro-stress does not consider any microstructural interactions as opposed to the microstress that is the stress caused by the interaction of the microstructure. A representative volume (or surface area) element (RVE) is determined for each node 54. The RVE grid is different from the FEM grid. Actually, not all nodes of the FEM model need be considered. The RVE development is performed for each node with a stress above the fatigue limit 52. In most cases only a few of the nodes need to be analyzed.

Each RVE is then modeled as a simple test specimen using the method of FIGS. 3(a) to 3(c) to provide a probabilistic microstructure-based failure model 46 of the RVE. Each element can have a different microstructure, loading, failure mechanisms, surface area and volume. The component is modeled as an assemblage of RVEs 60. Each RVE has a stress and size and microstructural based failure model.

Figure 9:
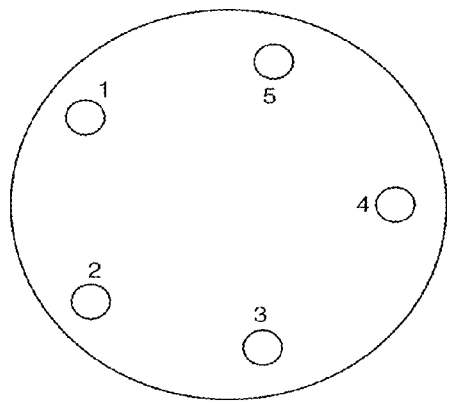
FIG. 9 is a drawing of a wheel with five holes for Examples 2 and 5.
Figure 10:
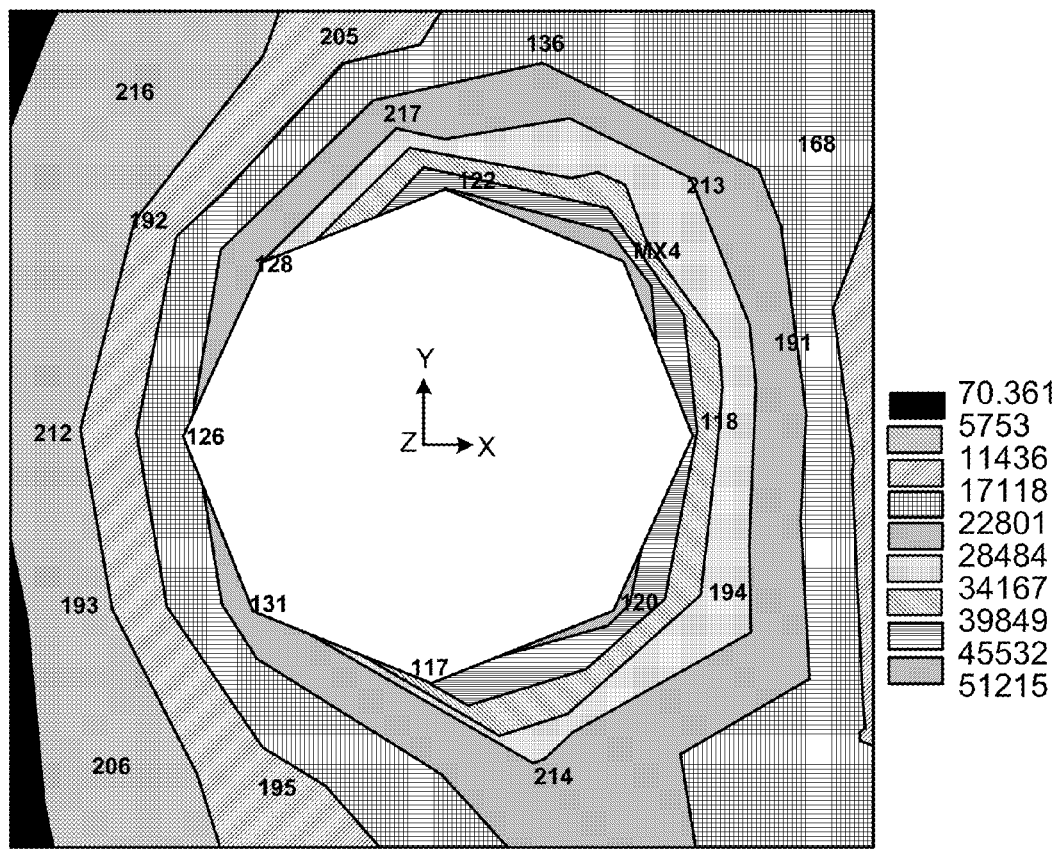
FIG. 10 is a close-up of a Finite Element Model showing a region of high stress and the location of the FEM nodes in that high stress region for Examples 2, 3, and 5.

FIG. 9 shows a wheel with 5 holes. The wheel has a constant thickness of 0.5 inches. The holes have a diameter of 0.08 inches. The wheel transmits 2700 pound of force to a shaft bolted to the holes. A finite element model is developed 48 of the loaded wheel and the von Mises stress predictions 50 are determined. The loading condition causes high stress around the holes. FIG. 10 shows a close up of the high stress area along with the location of the nodes of the FEM model for one hole. The stress level is represented by different shades in FIG. 10. The stress associated with each shade is shown at the right of the figure in units of pounds per square inch (psi). The maximum stress is 51215 psi at node 124.

TABLE 2

Input to Example 2.

| Variable | Description | Distribution Type | Distribution Parameters | | Average | COV |
|---|---|---|---|---|---|---|
| C | Paris Law Coefficient | Lognormal | $\lambda = -0.034$ | $\zeta = 0.30$ | $4.0 \times 10^{-9}$ psi$\sqrt{\text{in}}$ | 0.30 |
| C' | CTOD Law Coefficient | Deterministic | N/A | | 0.10 | N/A |
| d | Grain diameter | Lognormal | $\lambda = -0.076$ | $\zeta = 0.39$ | .005 in | 0.40 |
| $n_{comp}$ | # of component | Deterministic | N/A | | 100,00 | N/A |
| G | Bulk Shear Modulus | Deterministic | N/A | | $11 \times 10^6$ psi | N/A |

TABLE 2-continued

Input to Example 2.

| Variable | Description | Distribution Type | Distribution Parameters | | Average | COV |
|---|---|---|---|---|---|---|
| k | Frictional Strength | Weibull | $\eta = 1.12$ | $\zeta = 3.7$ | 10,000 psi | 0.30 |
| $k_{crit}^{M}$ | Critical Microstructural Stress Intensity Factor | Deterministic | N/A | | 700 psi$\sqrt{in}$ | N/A |
| $M_S$ | Schimd Orientation Factor | Curve Fit | | | 2.21 | 0.08 |
| $M_T$ | Taylor Orientation Factor | Curve Fit | | | 3.07 | 0.13 |
| N | Paris Law Exponent | Deterministic | N/A | | 3 | N/A |
| $W_S$ | Specific Fracture Energy | Deterministic | N/A | | 3600 lbs/in | N/A |
| v | Poisson's Ratio | Deterministic | N/A | | 0.3 | N/A |
| σ | Applied Microstress | Normal | $\mu = 1$ | $\sigma = 0.3$ | 15000 psi* | 0.30 |

*Note: The stress level is also the applied global stress.

Figure 11:
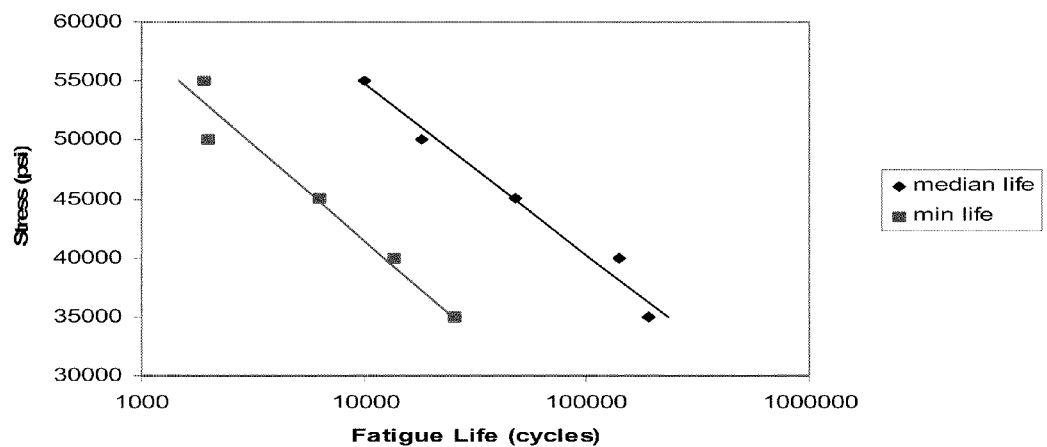
FIG. 11 is a graph of the S-N curve for smooth round bar specimens of the wheel material for Example 2.

To perform a typical traditional fatigue analysis, assume the S-N curve of FIG. 11 is available for the wheel material. This curve was developed from smooth round bar (SRB) test based on the model 46 and the material input properties of Tables 1 and 2. The SRB's had a surface area of 0.61 in². The "min" line in FIG. 11 refers to the −3σ probability of failure. The fatigue limit is 40 ksi. A typical fatigue life analysis finds the allowable cycles from the S-N curve for the maximum predicted stress from the FEM model. Using FIG. 11, a stress of 51215 psi yields a median life of 17600 cycles and a −3σ life of 2500 cycles.

A probabilistic microstructural fatigue analysis uses much of the same information as the typical fatigue analysis. What is not included in typical fatigue analyses is the size effect. The size effect consideration is critical to reliability analysis. In reality, the typical fatigue analysis above predicts the fatigue life of a SRB stressed to 51.2 ksi. Similitude is assumed i.e., it is assumed that the wheel is similar to the test specimen. Similitude can only be achieved if the test specimen and the wheel have a similar geometry and stressed area. Although the size effect phenomenon is generally accepted and near component shape specimens are sometimes tested, often only standard test specimen data is available.

Probabilistic microstructural fatigue models address the size effect issue by using the primitive physics that governs the underlying fatigue behavior 2. By using primitive physics models, probabilistic microstructural models predict the test specimen behavior. Typical fatigue models are curve fits to the test specimen behavior. Their bases lies in the test specimens fatigue behavior. Thus, the assumption is made that the wheel is similar to the test specimen. This assumption is incorrect but it is still used to approximate the fatigue response of the wheel.

Although probabilistic microstructural models use specimen test data to identify fundamental physical phenomenon 5, their basis lies at the microstructural level. The similitude assumption made with the probabilistic microstructural models is that the microstructure of the wheel is similar to the microstructure of the test specimens. Microstructural similitude is often easier and less costly to achieve than similitude at the specimen level.

Figure 12:
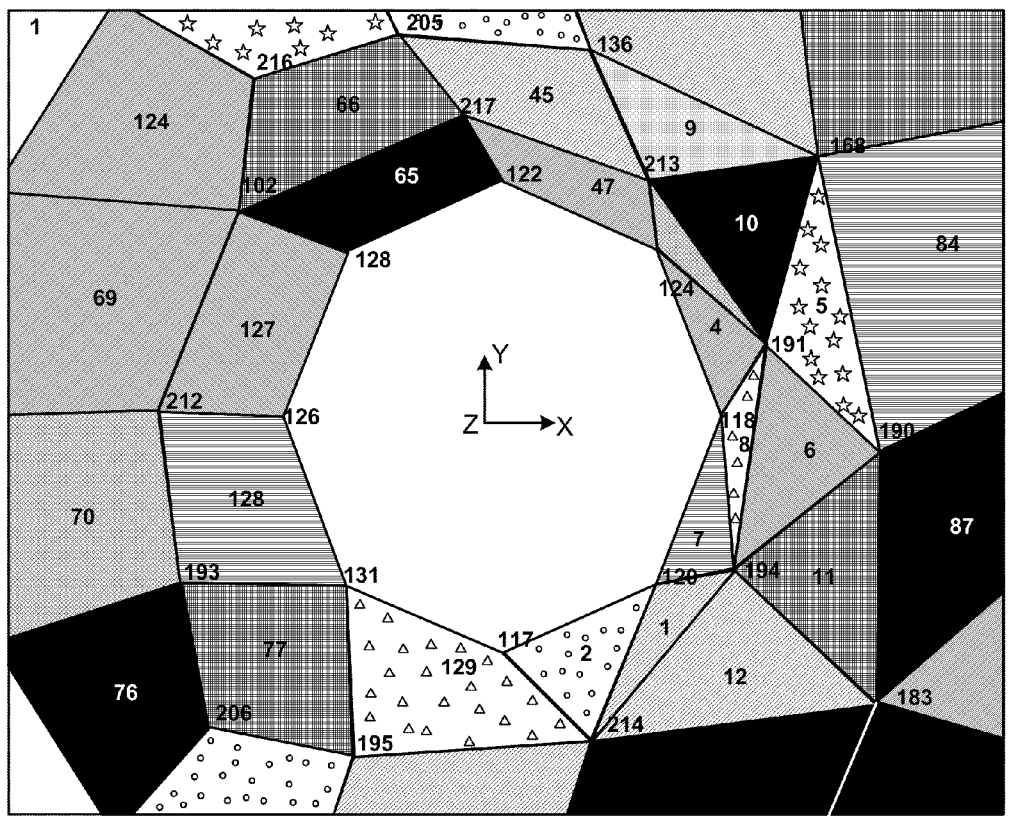
FIG. 12 is a close-up of a Finite Element Model near a high stress region for Example 2.

To apply the probabilistic microstructural fatigue model, the area at each stresses level must be determined 54. Since the nodal stresses (or strains) are most often used in fatigue analysis (as opposed to the average element stresses), the area near each node is assumed to have consistent stress equal to the nodal stress. The area calculation is performed for each significant node with a stress above the fatigue limit 52. The fatigue limit is assumed to be 40 ksi. Five nodes had a stress level above the fatigue limit. FIG. 12 shows a close-up of FEM model near the high stressed region. Element numbers are at the center of the elements. Node numbers are at the corners of the elements. Consider node 124 that lies in element 3, 4 and 47. The FEM analysis calculates the area of each element. Element 3 had 3 nodes. One third of the area of element 3 is attributed to node 124. Likewise for element 4. Element 47 had 4 nodes. One fourth of the area of element 47 is attributed to node 124. The areas attributed to node 124 at each element are then summed. This is the area of a RVE 54 that is used in the probabilistic fatigue model. Table 3 shows the stress and area for each RVE of the five node above the fatigue limit for the hole.

In this example assume that each RVE consist of statistically similar microstructure. The probabilistic microstructural fatigue model 46 and the material input properties of Tables 1 and 2 are applied to each RVE 56. It is determined that 10,000 Monte Carlo simulations are needed for statistical significance 58. Each grain is a potential nucleation site. The probabilistic microstructural fatigue model 46 includes the information on the grain size 62. The grain size is random. Monte Carlo simulation is used to choose the number of grains needed to cover the RVE area 64. One grain is chosen at random along with the properties associated with the grain 68.

The microstructural fatigue analysis 70 is performed to determine the number of cycles needed for the crack to grow from this grain to failure 72. The process 68 through 72 is repeated for each grain of the RVE to determine the cycles to failure for each nucleation site 66. The fatigue life of each of the RVE is determined 74 as the minimum life associated with each grain. This process 62 through 74 is repeated for each of the five RVEs 76.

The life of the hole 78 is equal to the life of the RVE with the minimum life. The location of the RVE with the minimum life is also recorded. This is the location of the initiation site. Ten thousand holes are simulated in this manner 82.

TABLE 3

RVE of the hole model.

| Node | Stress (ksi) | Area (sq in) | Initiation site (%) |
|------|--------------|--------------|---------------------|
| 117  | 45.0         | 2.53E−02     | 7                   |
| 118  | 41.4         | 1.20E−02     | 0                   |
| 120  | 47.5         | 1.79E−02     | 13                  |
| 122  | 46.1         | 1.71E−02     | 7                   |
| 124  | 51.2         | 1.37E−02     | 36                  |

Figure 13:
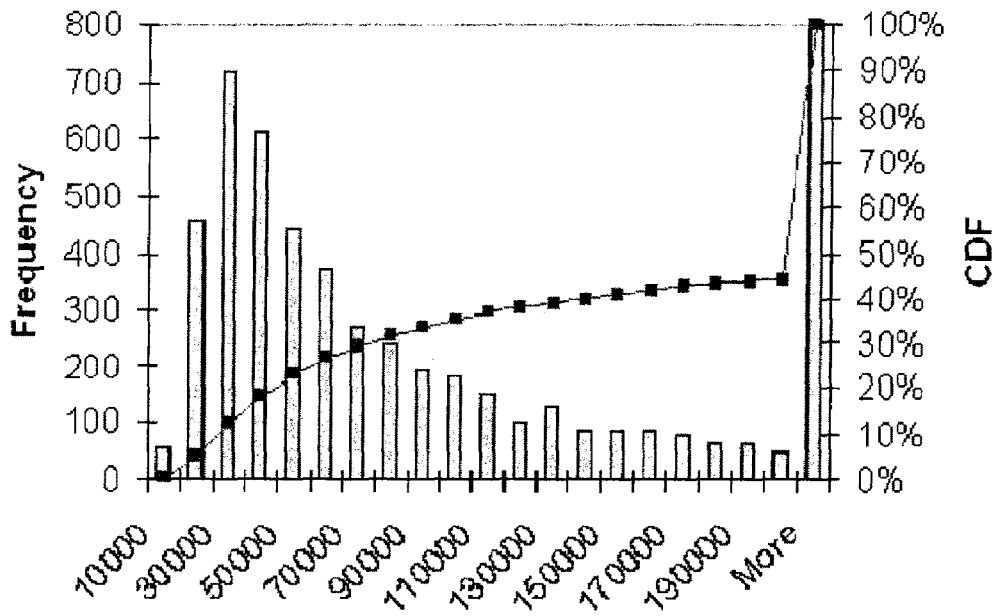
FIG. 13 is a graph showing the statistical distribution of fatigue predicted by the probabilistic microstructure-based failure model for the hole of Example 2.

The histogram and cumulative density function 80 of the fatigue life for the hole are shown in FIG. 13. The median fatigue life is 386,000 cycles. The minimum allowable fatigue life (minus three standard deviation life) is 6000 cycles. The percent of holes that initiated failure at each location is shown in Table 3.

This is more than the traditional fatigue analysis life of 2500 cycles because the highly stressed area of material around the hole was smaller than the 0.61 in$^2$ that was the underlying assumption in the traditional analysis. The median life is much higher than the traditional fatigue analysis life of 17,600 cycles because 37% of the holes did not fail at the test suspension ($10^{10}$ cycles). Traditional fatigue analysis cannot predict test suspensions. Either all of the components fail or none of the components failure in a traditional fatigue analysis. Traditional fatigue analysis also cannot differentiate initiation sites.

EXAMPLE 3

The following example illustrates a preferred embodiment of the method of the invention that uses probabilistic microstructure-based models using FEM results to large RVEs. The example is further illustrated by FIGS. 10, 14, and 15. The probabilistic microstructure fatigue model evaluates the fatigue resistance of each nucleation site of the RVE. A large structure such as a bridge could easily have very large RVEs that could have more than $10^{10}$ nucleation sites. If, during the fatigue simulation, we wish to consider thousands of structures, the number of nucleation sites to consider becomes large and the computational time can become significant. In this example, we will extend the concept of the extreme value statistics to fatigue of large RVEs.

Consider a large RVE that has a fatigue response controlled by transgranular (non-defect) crack nucleation. The fatigue response of the structure is an extreme value problem because the grain that nucleates a crack and grows to failure first will control the fatigue life. The grain that caused failure is the extreme grain.

Extreme value statistics can be extended to surface area (or volume if subsurface nucleation is an active failure mode) by determining the fatigue life of a small area and then consider the large RVE as being compose of many small areas. This means that in FIG. 3(d) the life of the RVE 74 is not based on determining the cycles to failure for each nucleation site 66 but simulating a statistically significant sample of nucleation sites and approximating the life of the RVE 74 based on the extreme value statistics of the sample.

In the example of the bridge RVE, assume the RVE has an area of 10 in$^2$. The statistical distribution of fatigue life for a small area of 1 in$^2$ is found. The life of the 10 in$^2$ RVE is the minimum life of 10 of the small area samples. Using area as the basis for our extreme value distribution has an additional benefit. The fatigue failures may be nucleated at defects. The defect distributions are usually defined by area or volume. In the discussion below, extreme value statistics is applied at the grain level and then extended to surface area.

Considering that there are n grains on the surface of the test specimen. The life of the specimen is given by Equation (16).

$$Y = \min(X_1, X_2, \ldots, X_n) \quad \text{Eq. (16)}$$

Y is the minimum life and $X_1$'s are the fatigue lives of the individual grains in the specimen 72. It is assumed that the fatigue of the individual grains, $X_1, \ldots, X_n$ are independent and identically distributed. Based on the above assumption, the probability distribution of Y can be derived from the initial distribution of $X_i$ where $X_i$, is the statistically significant sample of nucleation sites (grains).

It is observed that if Y, the smallest among $(X_1, \ldots, X_n)$ is greater than some value, y, then all other values in the sample must be greater than y also. Hence, the probability that Y is greater than y can be written as Equation (17).

$$P(Y > y) = P(X_1 > y, X_2 > y, \ldots, X_n > y)^n \quad \text{Eq. (17)}$$

Equation (17) can be rewritten as:

$$1 - F_Y(y) = [1 - F_X(y)]^n \quad \text{Eq. (18)}$$

where, $F_Y(\,)$ is the cumulative distribution function (CDF) of Y and $F_X(\,)$ is the CDF of X. Rearranging the terms in Equation (18), we get the CDF of Y as:

$$F_Y(y) = 1 - [1 - [-F_x(y)]^n \quad \text{Eq. (19)}$$

The corresponding probability density function (PDF) of Y can then be determined from Equation (19) as Equation (20).

$$f_Y(y) = n \cdot [1 - F_x(y)]^{n-1} f_x(y) \quad \text{Eq. (20)}$$

where, $f_x(\,)$ is the probability density function (PDF) of X. Equations (19) and (20) are the exact forms of the extreme value distribution of the minimum life Y.

The above concept determines the probability distribution of the minimum life from a sample of n grains. This can simply be extended to determine the probability distribution of the minimum life from a sample of n surface areas. For example, $X_i$ could represent the minimum life of a representative surface-area-element of say 0.01 in$^2$. Then for a bar with a surface area of 1 in$^2$, n (the total number of representative surface-area-elements in the bar or the sample size) would be 100. Equation (20) is used to determine the minimum fatigue life for the bar 78.

Figure 14:
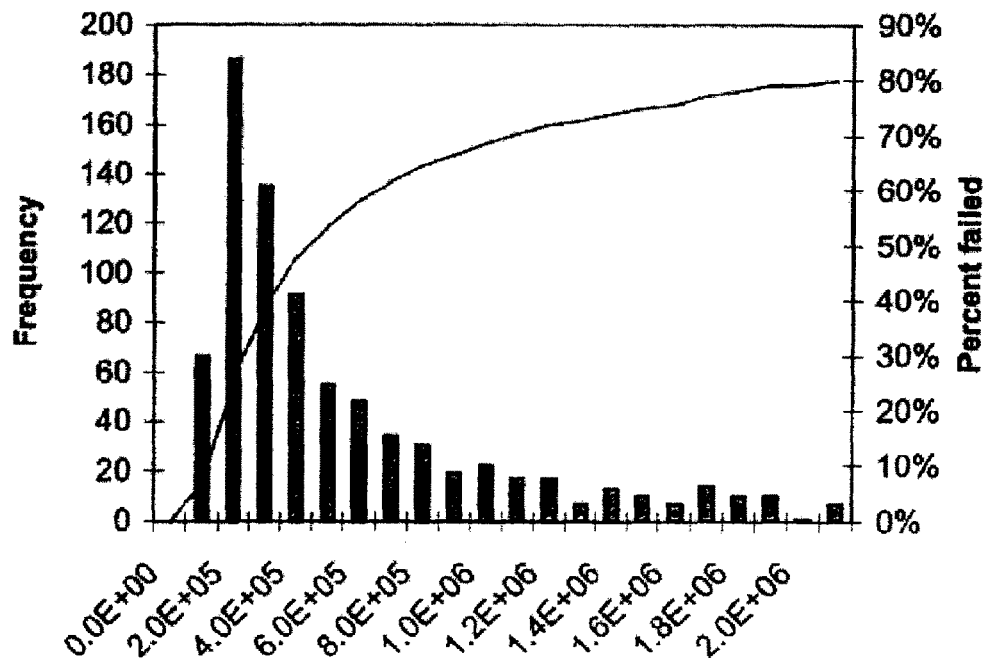
FIG. 14 is a histogram of fatigue lives for 1000 small size bars tested at 90 ksi for Example 3.

As an example, consider the alloy modeled using 46 and the material input properties of Tables 1 and 2. Let us simulate the fatigue test of 1000 area of 1 in$^2$ bars of this alloy and a load of 90 ksi. FIG. 14 shows the histogram of the simulated-test results.

We can use Eq. (19) and the simulated fatigue distribution from the small (1 in$^2$) area to estimate the fatigue distribution of a RVE with an area of 10 in$^2$ as shown in Table 4 where the first column is the number of cycles for which the probability is to be determined, the second column is the percent of small areas that failed and the third column is the predicted percentage of failures for the RVE.

TABLE 4

Prediction of probability of failure for RVE tested at 90 ksi.

| Cycles y | % failed 0.001 in$^2$ bar $F_x(y)$ | Predicted % failed 0.01 in$^2$ bar $F_y(y) = 1 - [1 - F_x(y)]^{10}$ |
|----------|-----------------------------------|---------------------------------------------------------------------|
| 50000    | 0.2%                              | 1.98%                                                               |
| 60000    | 1.0%                              | 9.56%                                                               |
| 70000    | 2.3%                              | 20.7%                                                               |

TABLE 4-continued

Prediction of probability of failure for RVE tested at 90 ksi.

| Cycles y | % failed 0.001 in² bar $F_x(y)$ | Predicted % failed 0.01 in² bar $F_y(y) = 1 - [1 - F_x(y)]^{10}$ |
|---|---|---|
| 80000 | 3.6% | 30.6% |
| 90000 | 4.8% | 38.1% |
| . | . | . |
| . | . | . |
| . | . | . |

Figure 15:
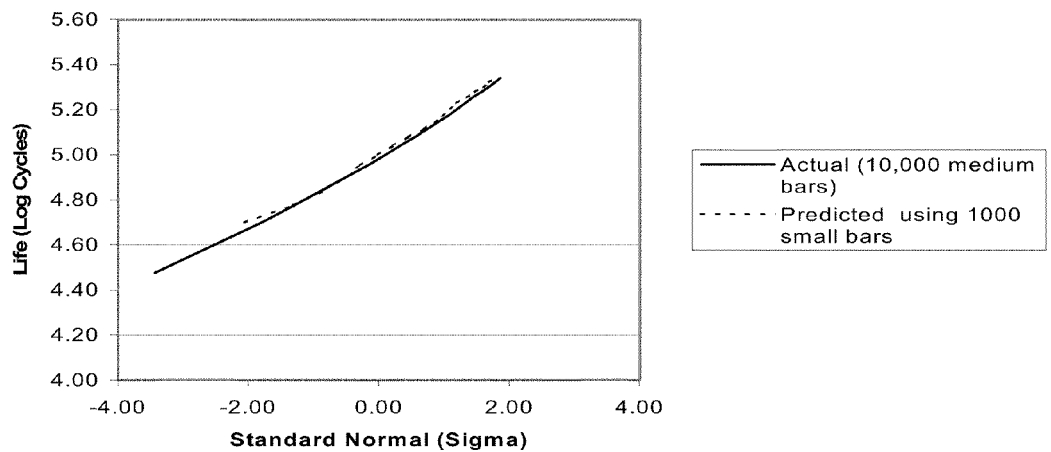
FIG. 15 is a graph showing the distribution of medium size bars tested at 90 ksi for Example 3.

To evaluate the accuracy of the predicted results in Table 4, a fatigue test of 10,000 RVEs was simulated. FIG. 15 compares the results of the simulated fatigue life distribution of RVE (designated as Actual in FIG. 15) with the fatigue life distribution predicted using Eq. (19) and the results of the simulated fatigue life distribution of 1000 areas of 1 in² (designated as Predicted). In general, the predicted results are in close agreement with the actual results.

Determining the statistical distribution of the 10.0 in² RVE base on the 1 in² area specimen require about one tenth the computation time as direct simulation of the 10.0 in² RVE. Once the statistical distribution of the RVE fatigue life has been determined as in FIG. 15, Monte Carlo simulation is used to establish the life for an individual RVE 74.

EXAMPLE 4

The following applies a preferred embodiment of the method of the present invention that uses probabilistic microstructure-based models using probabilistic FEM results. The example is further illustrated by FIGS. 16 and 17. The prior wheel examples, Examples 1, 2, and 3, applied a deterministic FEM model. But the approach is general and valid for probabilistic FEM models as well.

It is assumed that the wheel has random geometry and boundary conditions. The random variables are the wheel thickness T, the force F, and the diameter D of the holes. The deterministic FEM model described previously can be considered as a realization of the random model with each random variable defined at their mean value as shown in Table 3. The deterministic model is extended to a random model by allowing variation in each of the random variables with coefficients of variation show in Table 5. For this example problem, all variables are assumed to be normally distributed, but the algorithm developed is not restricted to normal distributions.

TABLE 5

Random variable statistics

| Random Variable | Mean | Coefficient of Variation |
|---|---|---|
| Thickness (T) | 0.5 in. | 0.05 |
| Load(L) | 2700 lbs | 0.10 |
| Diameter(D) | 0.8 in. | 0.04 |

Variations in the random variables cause variation in the nodal stresses of the FEM model. This means that the stress obtained at each node 50 will not be a described by a single deterministic value but by a statistical distribution.

To apply the probabilistic microstructural fatigue model to a probabilistic FEM model, a response surface equation is determined for each RVE that relates the nodal stresses to the random variables. A virtual design of experiment is used to determine the response surface relationship. It is assumed that the random variables are physically independent which is reasonable for this example. A series of seven finite element analysis are made. One analysis with each of the three random variables at the mean value and two "perturbed" analysis for each random variable. In three of the perturbed analyses, one random variable is increased slightly above the mean value while the other random variables remain at the mean value. For the other three perturbed analyses, one random variable is decreased slightly below the mean value while the other random variables remain at the mean value.

Because a linear FEM analysis was performed 50, a direct linear relationship exists between the nodal stress and the applied load (F). A direct linear relationship also exists between the nodal stress and the wheel thickness (T). Because the relationship between the nodal stress and F and T is known, the perturbed FEM analysis for F and T need not be performed. The only "unknown" relationship is between the nodal stress and the hole diameter (D).

Figure 16:
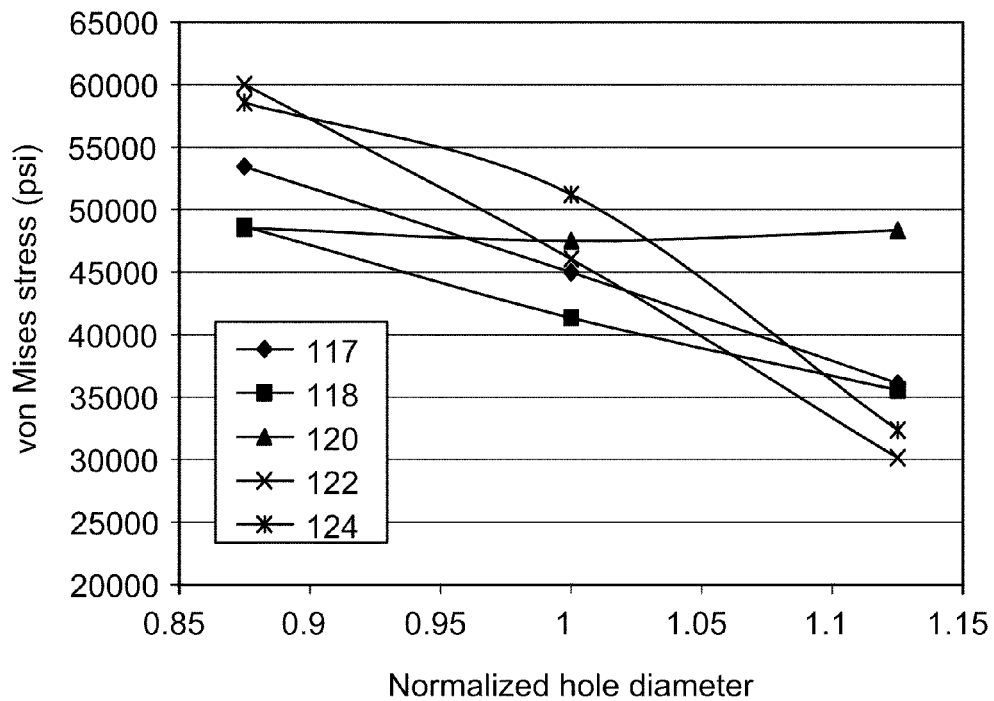
FIG. 16 is a graph showing the relationship between the nodal von Mises stress and the normalized hole diameter for Example 4.

FIG. 16 shows the results of the hole diameter perturbed FEM models for each of the nodes in the highly stresses area. (The hole diameter has been normalized by dividing by the mean value.).

The least square method was used to fit a second order response surface equation to the data in FIG. 16 for each node. Knowing the second ordered relationship between the nodal stress and the hole diameter and the linear relationship between the nodal stress and the other random variables, a response surface of the form of Equation (21):

$$\sigma = tf(Ad^2 + Bd + C) \qquad \text{Eq. (21)}$$

is developed where σ is the nodal von Mises stress, t is the normalized thickness ($T/T_{mean}$), f is the normalized force ($F/F_{mean}$) and d is the normalized hole diameter. A, B, and C are the coefficients of the second ordered relationship between a and d. Table 3 shows the stress relationship along with the nodal area for each node.

TABLE 6

RVE of the hole model.

| Node | Stress (ksi) | Area (sq in) |
|---|---|---|
| 117 | tf (−12160d² − 45024d + 102154) | 2.53E−02 |
| 118 | tf (48672d² − 149700d + 142378) | 1.20E−02 |
| 120 | tf (60096d² − 121096d + 108502) | 1.79E−02 |
| 122 | tf (−62240d² + 5060d + 103236) | 1.71E−02 |
| 124 | tf (−367488d² + 630072d − 211369) | 1.37E−02 |

The probabilistic microstructural fatigue model 46 is applied to the wheel bolt hole by simulating a hole consisting of RVEs for each node in Table 3. (The material microstructural fatigue property of each of the RVEs is described by the model 46 and the material input properties of Tables 1 and 2.) The parameters for each hole are determined by generating a random value for T, L, and D using the statistical distributions in Table 5. The nodal stresses are then determined for each RVE using the equations in Table 6. The fatigue life of each of the RVEs is determined 74. The life of the hole is equal to the minimum life of each of the RVEs 78. Monte Carlo simulation is used to simulate many holes in this manner.

Figure 17:
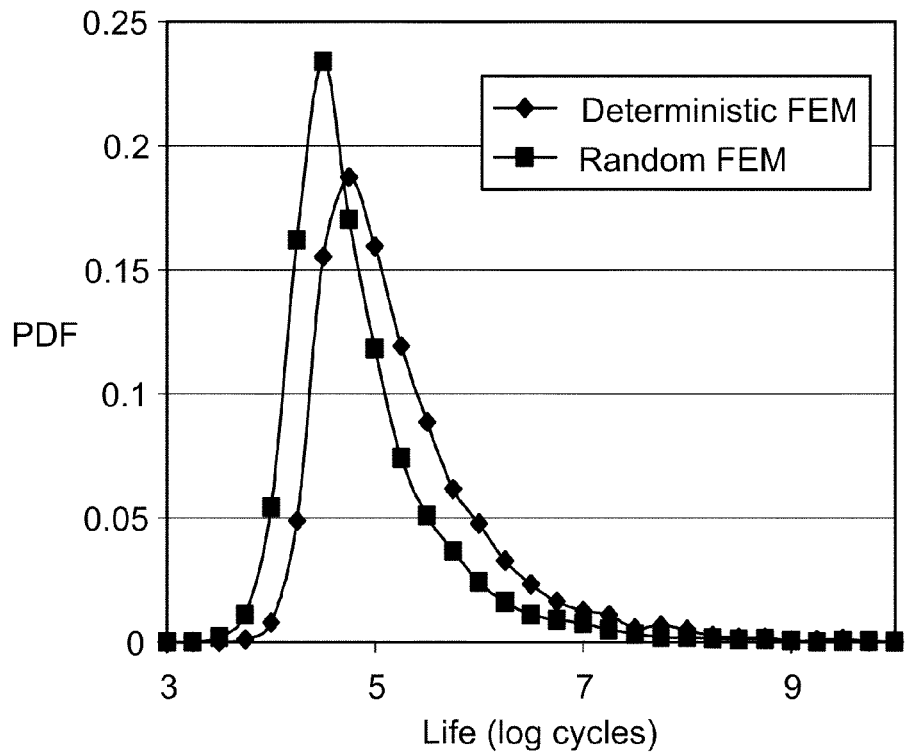
FIG. 17 is a graph showing the probability density function of the fatigue life of the failed holes for the deterministic and random holes of Example 4.

A fatigue test of 10,000 holes with random T, L, and D was simulated and compared with simulated test of 10,000 holes with deterministic (nominal) macrostructural parameters (T, L, and D). Forty two percent of the random holes did not fail at the test suspension (1010 cycles). Thirty seven percent of the deterministic holes did not fail at the test suspension. The probability density functions of the fatigue life for the failed holes are shown in FIG. 17.

The median fatigue life of the failed deterministic holes is 80,000 cycles. The minimum allowable fatigue life (minus three standard deviation life) is 5300 cycles. The median fatigue life of the failed random holes is 35,000 cycles. The minimum allowable fatigue life is 2800 cycles. For the example problem, the variation of the FEM model parameters significantly lowers the minimum allowable fatigue life.

The analysis presented in this example showed that probabilistic microstructural models can be integrated with stochastic finite element models. In the example problem, component geometry and applied loading were allowed to vary. The variation in the FEM model parameters culminated in a variation of the nodal stresses. Response surface methods were used to determine the relationship between the nodal stress and the random FEM model variables. The variation in the nodal stress served as an input to the probabilistic model 50. The hole was modeled in the probabilistic microstructural fatigue model 46 by assembling the appropriate RVEs.

EXAMPLE 5

The following example illustrate a preferred embodiment of the method of the invention that uses probabilistic microstructure-based models using probabilistic FEM results with correlated random variables. It is further illustrated using FIGS. 9, 10, 18, 19, and 20. This example illustrates the treatment of the statistical correlation that may exist between similar geometric details within the same component.

Most parameters in a structure are distributed in space, not concentrated at a point. Examples of such parameters are distributed loads, geometric properties such as thickness of a wheel, etc. Such quantities cannot be expressed as single random variables, but only as a collection of many random variables, which are statistically correlated. Statistical correlation between random variables is generally expressed by a correlation coefficient $\rho$. The value of this coefficient can vary between 0 and 1. A correlation coefficient value of 0 indicates that there is no correlation between the two variables and they are statistically independent of each other. Conversely, a correlation coefficient value of 1 indicates that there is perfect correlation between the random variables.

Consider many wheels each with five boltholes as in FIG. 9. The diameter of the boltholes for one wheel may be correlated because all of the holes on the wheel may have been drilled using the same operator, drill bit and drill press. Another wheel could have been machined using a different operator, bit and press. This would cause more similarity between diameters of the holes of a single wheel than between the holes of different wheels. Therefore, the diameters of the holes of a wheel are correlated. Similarly, because each wheel is forged independently, the variation of wheel thickness may be correlated. The loads at the boltholes of a wheel are likely to be highly correlated because the entire wheel experiences the same service duty For the example problem (see FIG. 9), wheel thickness, hole diameters and loads at the five holes are considered as random variables. The value of these random variables are correlated at each hole of the wheel i.e., if the thickness at one hole is thin, the thickness at the other holes on the wheel will tend to be thin. The correlation among the wheel thickness at the five hole locations is represented by the correlation matrix shown in Table 7. The matrix is symmetric. The matrix indicates that the correlation coefficient between the thickness values at any two locations is 0.7. This implies that if the thickness at any hole location is high, it is 70% likely that the thickness values at the other 4 hole locations will be high also and vice-versa. Table 7 shows that each random variable is perfectly correlated with itself. By using the full correlation matrix of Table 7, the correlation between any two locations can be defined (i.e., because hole 1 is close to hole 2, the correlation between 1 and 2 may be higher than the correlation between 1 and 3). If the correlation between 1 and 3 were 0.5, and the same relationship existed for the other holes, the correlation matrix would be as in Table 8.

TABLE 7

Correlation matrix for uniform correlation.

| | t1 | t2 | t3 | t4 | t5 |
|---|---|---|---|---|---|
| t1 | 1 | 0.7 | 0.7 | 0.7 | 0.7 |
| t2 | | 1 | 0.7 | 0.7 | 0.7 |
| t3 | | | 1 | 0.7 | 0.7 |
| t4 | | symmetric | | 1 | 0.7 |
| t5 | | | | | 1 |

TABLE 8

Correlation matrix for nonuniform correlation.

| | t1 | t2 | t3 | t4 | t5 |
|---|---|---|---|---|---|
| t1 | 1 | 0.7 | 0.5 | 0.5 | 0.7 |
| t2 | | 1 | 0.7 | 0.5 | 0.5 |
| t3 | | | 1 | 0.7 | 0.5 |
| t4 | | symmetric | | 1 | 0.7 |
| t5 | | | | | 1 |

A Monte Carlo simulation algorithm is used for generating correlated normal variables for input 24, 32, and 40 into the probabilistic microstructure fatigue program. For the correlation matrices shown above, the algorithm would be applied to generate sets of 5 correlated variables.

1. Five uniform random numbers are generated between 0 and 1 and stored in the vector $\{u\}$.
2. The vector uniform of random numbers is transformed to a vector of uncorrelated standard normal variables, $\{S\}$. The transformation is performed using the Inverse CDF Method (Ang and Tang, 1984). Standard normal variables have a Gaussian distribution with a mean value of 0 and a standard deviation of 1.
3. The vector $\{S\}$ is transformed to vector of correlated standard normal variables, $\{S'\}$ as follows:

$$\{S'\}=[L]\{S\} \qquad \text{Eq. (22)}$$

where [L] is the lower triangular matrix obtained from the Cholesky decomposition of the correlation matrix (Tables 7 or 8) of the 5 variables.

4. The correlated standard normals, $\{S'\}$, are transformed to correlated normal thickness variables, $\{t\}$, as follows:

$$\{t\}=\{S'\}[\alpha]+\{u\} \qquad \text{Eq. (23)}$$

where $[\alpha]$ is the diagonal matrix of the standard deviation of the variables and $\{u\}$ is the vector of the mean values of the variables.

The above steps are used to determine the correlated values of the wheel thickness T, the applied force F and the diameter D to be used in the response surface Eq. (21) (of Example 4) as follows.

Assume that the FEM model of the hole developed in the previous examples is a nominal hole in the wheel with five holes. FIG. 10 shows a close up of the high stress area along with the location of the nodes of the FEM model. As in the previous examples, the hole is assumed to be an assembly of five RVEs described by the nodal stresses and nodal areas associated with nodes 117, 118, 120, 122, and 124. These were the only nodes that have stresses above a pre-defined fatigue limit 52 of 40 ksi.

Assuming the wheel has random geometry and boundary conditions, the random variables are the wheel thickness T, the applied force F and the diameter D of the hole. The random variable statistics are shown in Table 3 but for this example, the random variables are correlated.

To apply the probabilistic microstructural fatigue model to a stochastic FEM model, a response surface equation (21) was determined for each node that relates the nodal stresses 50 to the random variables 56: Table 6 shows the stress relationship along with the nodal area for each node.

The fatigue life of a hole is simulated by finding the fatigue life of each RVE 60 and setting the fatigue life of the hole equal to the minimum fatigue life of all of the RVEs. Likewise, the fatigue life of a wheel with multiple holes is the minimum fatigue life of each of five holes.

Figure 18:
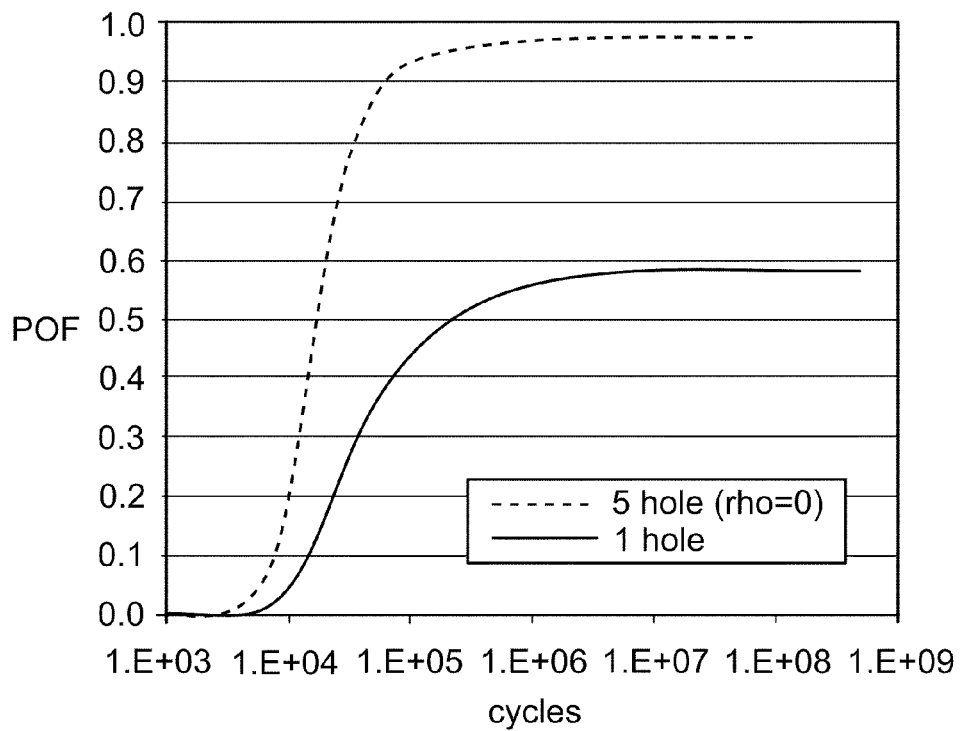
FIG. 18 is a graph showing the probability of failure (POF) cumulative density function of the fatigue life for wheels without correlation in Example 5.

A fatigue test was simulated for 10,000 wheels with random t, l, and d at each hole and no correlation between the random variables. (This means that all off diagonal terms of the correlation matrix have a value of zero.) The probability of failure (POF) cumulative density function (CDF) of the fatigue life is shown in FIG. 18. If there is no correlation between the random variables describing the holes of a wheel with five holes, the POF of the wheel can be determined from Equation (24).

$$POF_w = 1 - (1 - POF_h)^5 \qquad \text{Eq. (24)}$$

$POF_w$ is the POF of the wheel and $POF_h$ is the POF of one hole. The development of Eq. (24) was presented in Equations (16) through (19), but Equation (24) is not valid if the random variables are correlated.

Figure 19:
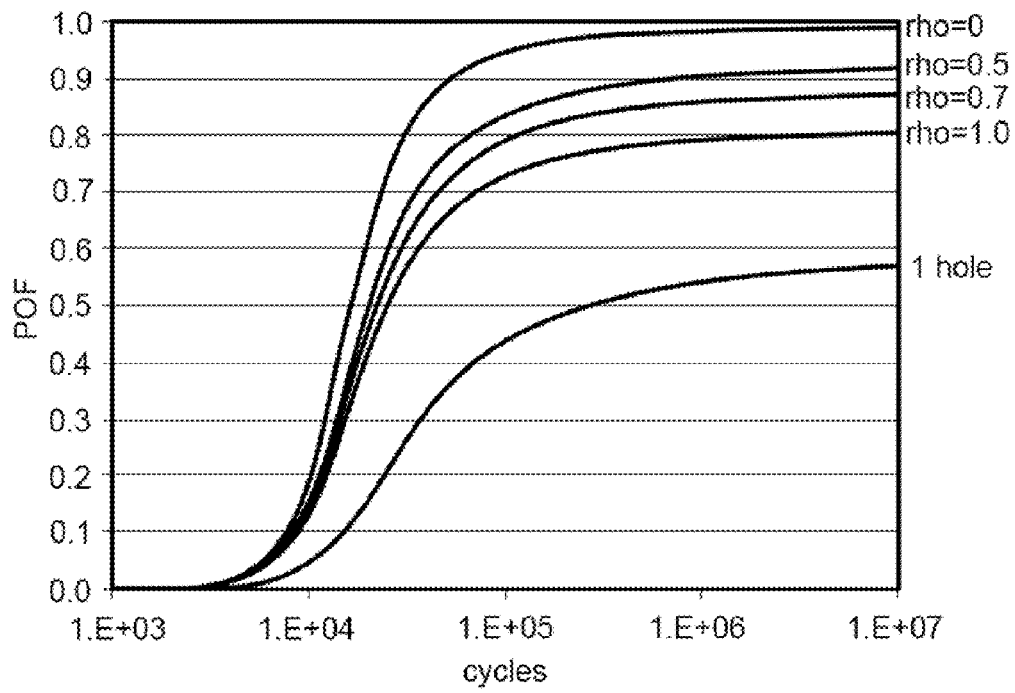
FIG. 19 is a graph showing the probability of failure (POF) cumulative distribution function of the fatigue life for wheels with various amount of correlation in Example 5.

A simulation of 10,000 wheels was performed with the random variables fully correlated ($\rho=1.0$) at each hole. FIG. 19 shows that the POF of the wheel is less for correlated variables than for uncorrelated variables. Two more simulations were performed, one with $\rho=0.7$ the other with $\rho=0.5$. FIG. 19 shows that the POF increases as $\rho$ decreases.

EXAMPLE 6

The following example illustrates a preferred embodiment of the method of the present invention for statistically describing the grain orientation factor for slip, depicted in FIG. 5, by applying that method to polycrystalline gamma titanium aluminide (TiAl). It is further illustrated using FIGS. 20 through 25. The geometric description of the active slip systems 140 for a single grain (colony) was used to determined a minimum Schmid factor for the grain. A Monte Carlo simulation was then used to generate an ensemble of grains with a uniform random distribution.

Figure 20:
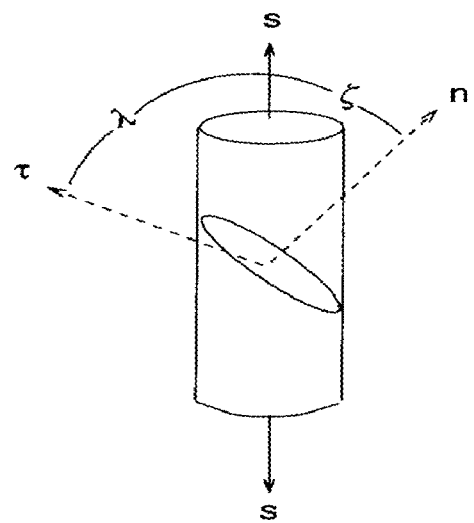
FIG. 20 illustrates the orientation of a slip system in Example 6.

Since plastic flow occurs on crystallographic slip planes in particular directions, the local shear stress, $\tau$, is a function of grain orientation and the applied stress. Consider a single grain with slip on a single plane in a single direction along $\tau$ as shown in FIG. 20. The resolved shear stress is given by Equations (25).

$$\tau = ms$$

$$m = \cos \zeta \cos \lambda \qquad \text{Eqs. (25)}$$

s is the applied stress, $\zeta$ is the angle from the slip plane normal to the loading axis, and $\lambda$ is the angle from the slip direction to the loading axis. m is referred to as the Schmid factor. $\tau$ is a maximum at $\zeta = \lambda = 45°$, $m = \frac{1}{2}$. $\tau$ is zero when the tensile axis is perpendicular to the slip plane ($\lambda = 90°$) or parallel to the slip plane ($\zeta = 90°$). The orientation factor is conventionally described by the reciprocal Schmid factor, M as Equation (26).

$$M = \frac{1}{m} \qquad \text{Eq. (26)}$$

$$= \frac{1}{\cos \zeta \cos \lambda}$$

Figure 21:
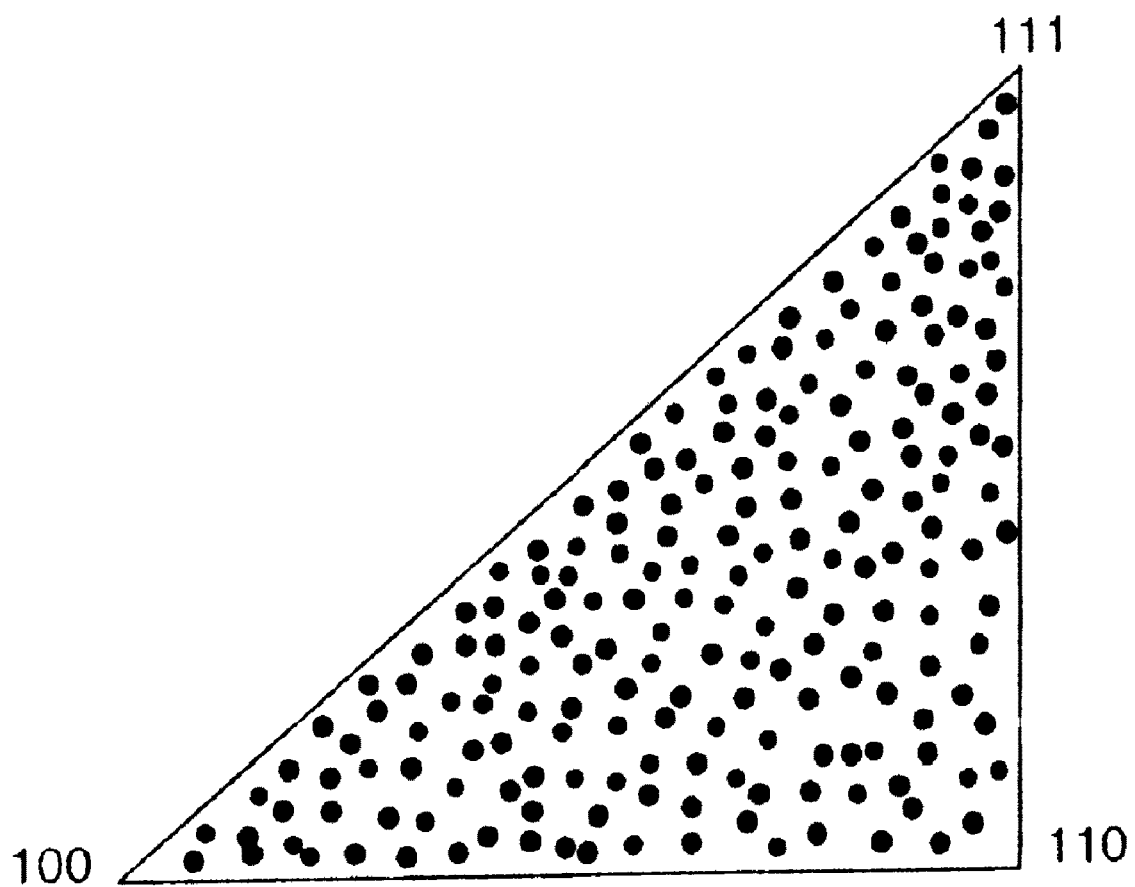
FIG. 21 depicts the stereographic triangle of a uniform statistical distribution of the Schmid factors for randomly oriented grains generated by a Monte Carlo simulation in Example 6.

In general, casting operations allow grains to solidify with uniformly random orientations. This orientation can be considered untextured. The orientations of the grains of an untextured (as-cast) polycrystalline material can be expressed as a uniform distribution of points within the stereographic triangle as shown in FIG. 21. The angle of the slip band normal $\zeta$ is uniformly distributed between 0 and 90 degrees.

Figure 22:
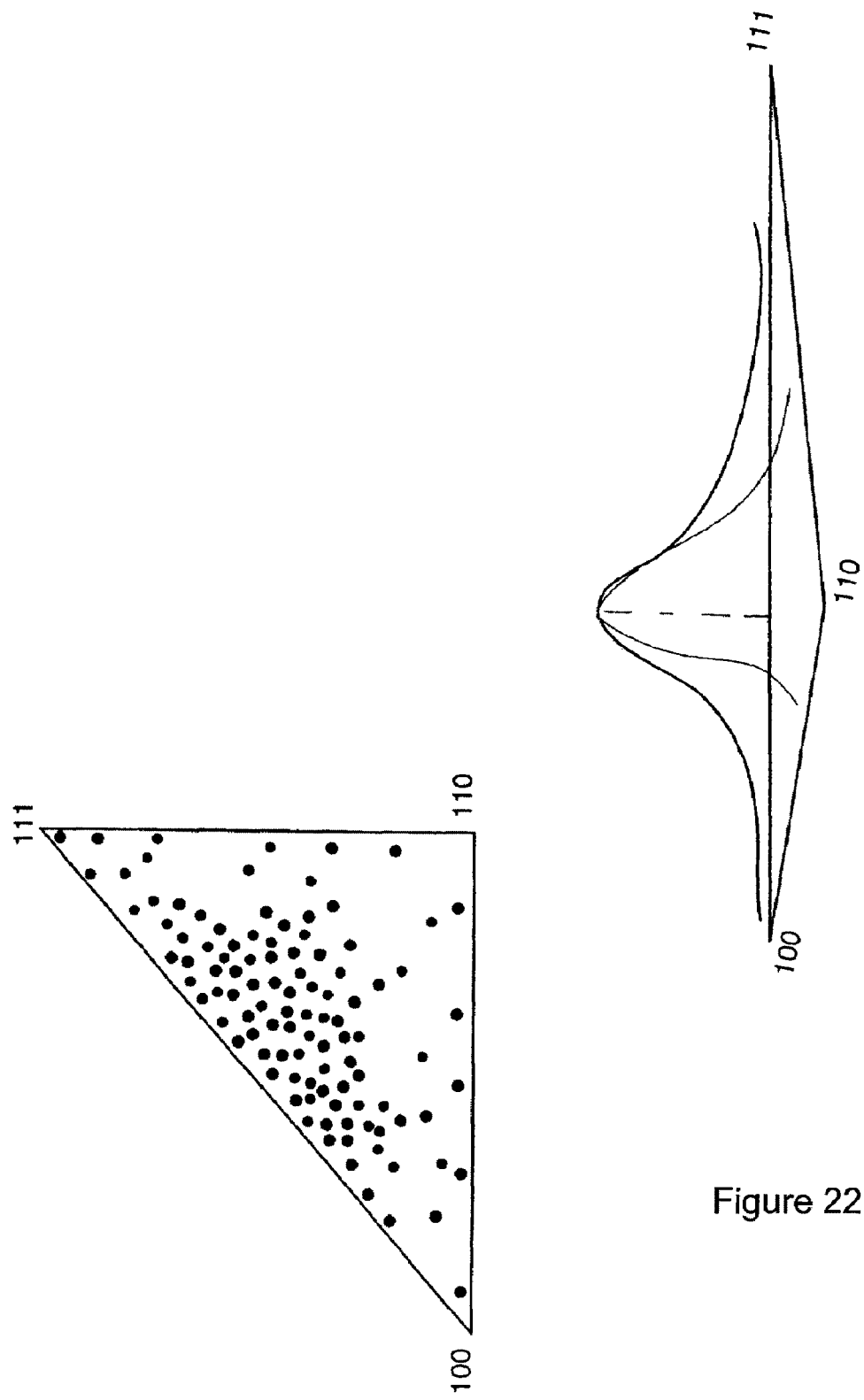
FIG. 22 depicts the stereographic triangle of the statistical distribution of Schmid factors for texture oriented grains in Example 6.

Deformation processes such as forging and rolling tend to alter the orientation of the grains. This preferred orientation is called textured microstructure. Micrographs of the etched surface along with process simulation models can be used to determine grain orientation after deformation operations. The texture 146 can be described as a weighted probability function within the stereographic triangle as shown in FIG. 22. The orientation with the most likely occurrence has the highest value. The orientation with the least likely occurrence has the smallest value. The statistical distribution of the slip factor can be determined using the described process except the uniform distribution between 0° and 90° of the slip plane normal for an untextured microstructure is replaced by the weighted probability function between 0° and 90°. This allows the determination of the effect of texturing 146 on the orientation factor for any polycrystal.

The crystallographic orientation of gamma titanium aluminide microstructure consist of alternating layers of plate-like domains. There are domains of various phases within the grain. The domain that is most important for fatigue type loading can be considered similar to face center cubic (fcc). The important slip system of this domain has the slip plane and the slip direction parallel to the plate. This system can be represented by the single slip system of FIG. 20. The angle between the load direction and the slip plane normal $\zeta$ can be any angle between 0° and 90°. But the minimum value of $\lambda$ is the complement of $\zeta$ such that:

$$(90° - \zeta) \leq \lambda \leq 90 \qquad \text{Eq. (27)}$$

The titanium aluminide grains are composed of colonies with many lamellae domains. There is a matrix-twin relationship between the lamellae. Each colony contains three matrix-twin pairs for a total of six easy slip directions, all 600 degrees apart in the same slip plane. Because slip occurs in both directions, there are 3 independent directions for slip; 0°, 60° and 120°. Therefore, once one domain's orientation is defined, there will be other domains in the same colony with relative slip directions of 60° and 120° from the first slip direction, all in the same slip plane. This matrix-twin relationship effects the statistical distribution of the reciprocal Schmid factor.

Figure 23:
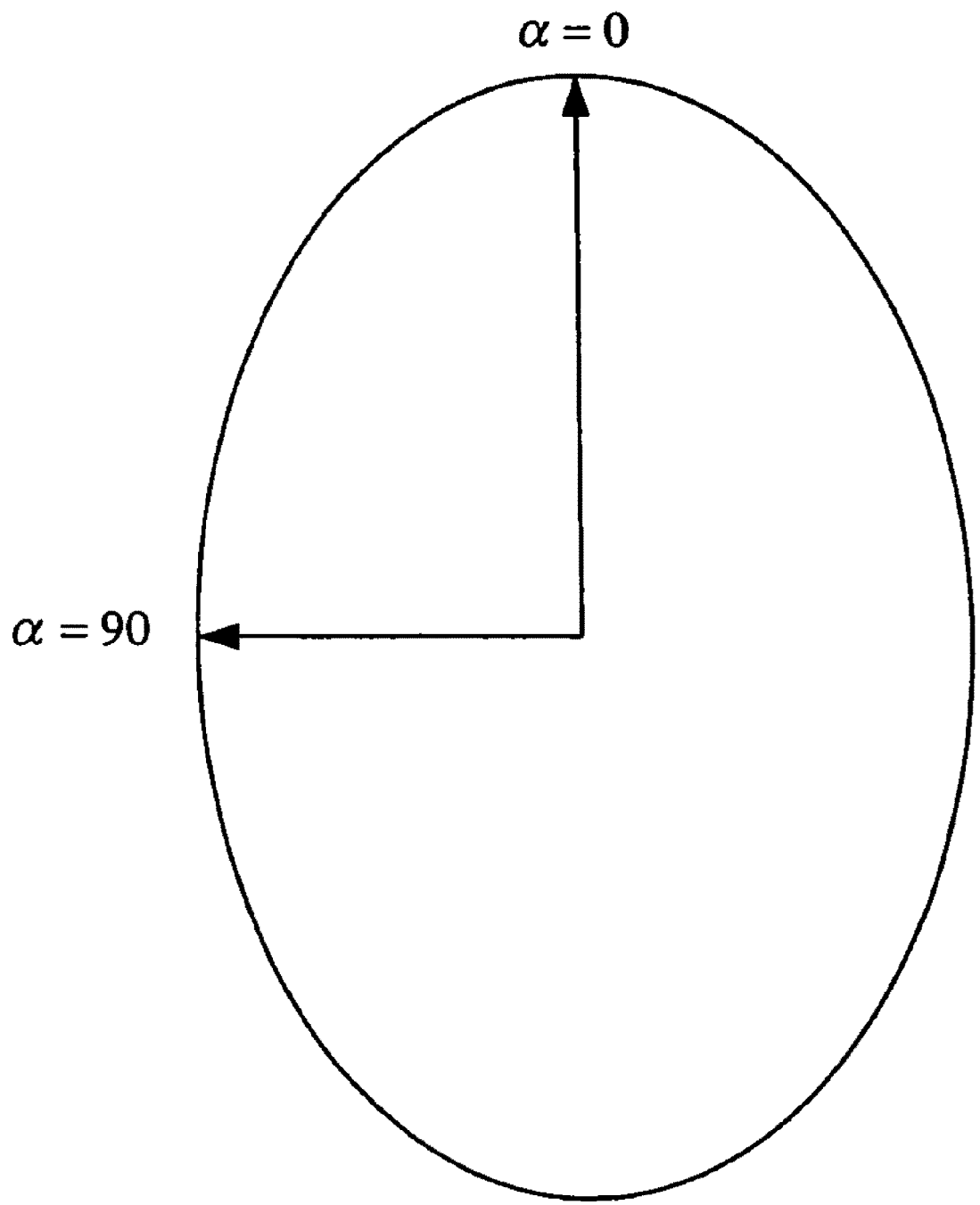
FIG. 23 is a top view of the slip plane of FIG. 19 in Example 6.
Figure 24:
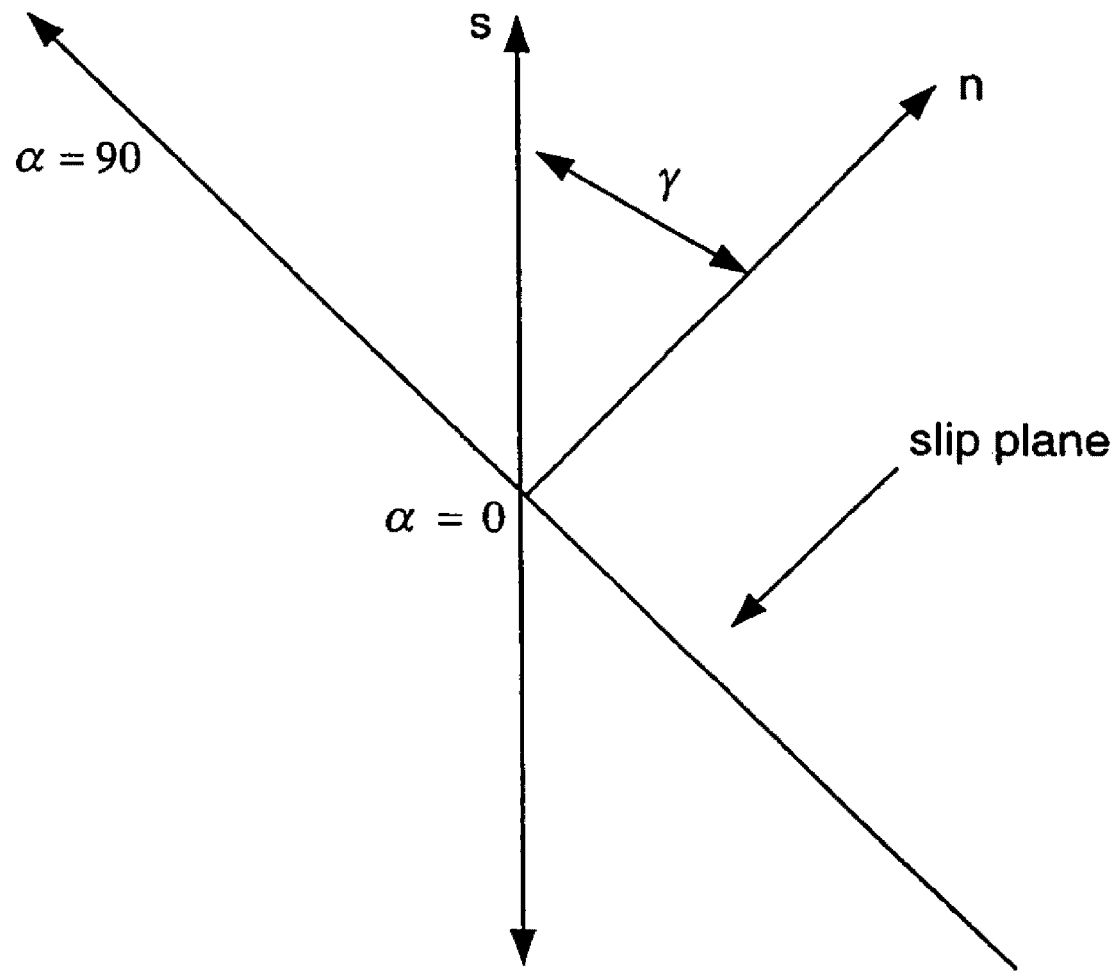
FIG. 24 is a side view of the slip plane of FIG. 19 in Example 6.

Consider FIG. 23 where the ellipse represents the top view of the slip plane shown in FIG. 20. Let us define an angle $\alpha$ of a slip direction in the slip plane such that when $\alpha=0$, $\lambda=90°$ and when $\alpha=90°$, $\lambda=90°-\gamma$. FIG. 24 represents the side view of this configuration with the slip plane perpendicular to the plane of the paper and $\alpha=0°$ into the paper. If $\alpha_1$ represents the angle of the slip direction in the slip plane of an arbitrary slip system, then within the same colony two other slip systems exist $\alpha_2$ and $\alpha_3$ such that:

$$\alpha_2 = \alpha_1 + 60°$$

$$\alpha_3 = \alpha_1 + 120 \quad \text{Eqs. (28)}$$

The angles are bounded such that:

$$0° \leq \alpha_1 \leq 90°$$

$$60° \leq \alpha_2 \leq 150°$$

$$120° \leq \alpha_3 \leq 210° \quad \text{Eqs. (29)}$$

A relationship between the angles exist such that:

$$\alpha_1 = \frac{90°}{\zeta}(90° - \lambda_1) \quad \text{Eq. (30)}$$

where $\lambda_1$ as the angle between the slip direction and the loading axis corresponding to $\alpha_1$. If we know $\lambda^1$ and $\zeta$ of one slip system we can use Equations (27) and (26) to find $\lambda_2$ and $\lambda_3$ for the other two slip systems available within the same colony such that:

$$\lambda_2 = 90° - \frac{\alpha_2}{90°}\zeta, \quad \text{for } 60° \leq \alpha_2 \leq 90° \quad \text{Eqs. (31)}$$

$$\lambda_2 = 90° - \frac{180° - \alpha_2}{90°}\zeta, \quad \text{for } 90° \leq \alpha_2 \leq 120°$$

$$\lambda_3 = 90° - \left|\frac{180° - \alpha_3}{90°}\right|\zeta$$

($\zeta$ is the same for all of the slip systems within the colony.)

The statistical distribution of the minimum Schmid factor can be determined 150 for the three slip systems as follows:

1. Assume that the orientation of the domain is untextured 146 and thus, all orientations are equally likely. Therefore, $\zeta$ (the angle of the slip plane normal) is uniformly distributed between 0° and 90°. The Monte Carlo technique can be used to choose λ for each domain.
2. The angle between the slip direction and the loading axis (λ) is uniformly distributed between $\zeta$ and the complement of $\zeta$ as shown in Equation (27). Again, Monte Carlo can be used to choose λ for each domain 152.
3. Equation (30) is used to determine $\alpha_1$ 154.
4. Equation (28) is used to determine $\alpha_2$ and $\alpha_3$ for the other two slip systems 154.
5. Equations (31) are used to determine $\lambda_2$ and $\lambda_3$ for the other two slip systems 154.
6. Equation (26) is used to define M for each of three slip systems 156.
7. The reciprocal Schmid factor for the colony is the minimum M from each of the three slip systems 158.
8. Steps 1 through 7 are repeated many times to determine M for many colonies 160.

(It is interesting to note that 3 is always greater than $\lambda_1$ or $\lambda_2$, thus $\lambda_3$ will never produce the minimum M and does not need to be considered in the above analysis.)

Figure 25:
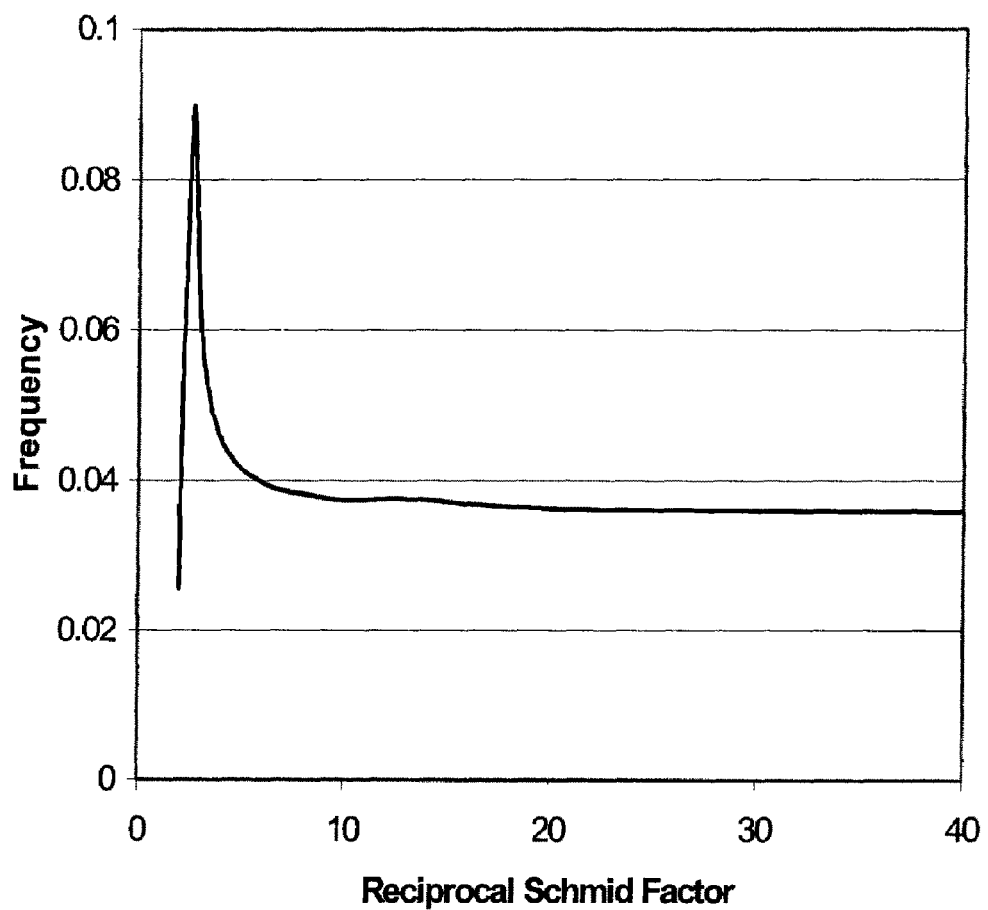
FIG. 25 is a graph illustrating the predicted probability density function of the reciprocal Schmid factor for slip in fully lamellar titanium aluminide (TiAl).

The prediction from the above analysis 162 is shown in FIG. 25 for 100,000 repetitions of steps 1 through 7. The reciprocal Schmid factor for fully-lamellar TiAl has a minimum value of 2 which occurs when λ and $\zeta$ are 45°. The maximum value is infinity. This is because M is high for $\zeta$ near 90°. The mean value is about 3.4.

It is to be understood that while illustrative embodiments of the invention have been shown and described herein, various changes and adaptions in accordance with the teachings of the invention will be apparent to those of ordinary skill in the art. Such changes and adaptions nevertheless are included within the spirit and scope of the invention as defined in the following claims.

What is claimed is:

1. A method for predicting the failure of a component, the method comprising:
    obtaining a Finite Element Model (FEM) of a component;
    analyzing said FEM to obtain stresses at nodes of said FEM;
    identifying a subset of said nodes as significant nodes based on said stresses;
    determining a Representative Volume Element (RVE) for at least one of said significant nodes;
    developing an RVE microstructure-based failure model for at least one said RVE;
    simulating a component life using at least one RVE microstructure-based failure model, said simulating producing a result related to said component life;
    performing said simulating a plurality of times to produce results related to component life;
    preparing statistics using said results; and
    comparing said statistics to a probability of failure (POF) criteria to determine whether said performing predicted failure for said component.

2. The method of claim 1, wherein said failure is due to fatigue.

3. The method of claim 1, wherein each said RVE microstructure-based failure model comprises at least one random variable and wherein probabilistic methods are used to provide values for said at least one random variable.

4. The method of claim 1, wherein said simulating further comprises:
    establishing an RVE life for each said RVE; and
    using each said RVE life to produce the result related to said component life.

5. The method of claim 1, said developing comprising:
    identifying a material microstructure in said RVE;
    characterizing how damage interacts with said material microstructure to provide at least one damage mechanism; and
    creating a failure model for said material microstructure based on said at least one damage mechanism, said creating comprising:
        finding a sequence in which said at least one damage mechanism works to damage said material microstructure;
        getting for each said at least one damage mechanism one of a group of models consisting of: a crack nucleation model, a short crack growth model, and a long crack growth model; and
        linking said models to produce said RVE microstructure-based failure model based on information from said identifying, characterizing, and finding.

6. The method of claim 5, said characterizing further comprising:
    determining said material microstructure's mechanical characteristics; and
    determining said material microstructure's bulk elastic material characteristics.

7. The method of claim 5, wherein said finding comprises:
    determining how many of said at least one damage mechanism are crack nucleation mechanisms;

determining how many of said at least one damage mechanism are short crack growth mechanisms;

determining how many of said at least one damage mechanism are long crack growth mechanisms; and developing a strategy for linking said crack nucleation, short crack growth, and long crack growth mechanisms.

8. The method of claim 5, wherein said RVE microstructure-based failure model comprises random variables and wherein probabilistic methods are used to provide values for said random variables.

9. The method of claim 5, wherein said getting comprises developing at least one of said group of models.

10. The method of claim 5, wherein said getting further comprises:

identifying variables that are important in the description of each said at least one damage mechanism;

relating said variables that are important to one of a group of damage mechanisms consisting of: a crack nucleation mechanism, a short crack growth mechanism, and a long crack growth mechanism to form, respectively, one of a group of models consisting of: a crack nucleation model, a short crack growth model, and a long crack growth model; and defining output from said one of a group of models.

11. The method of claim 1, said simulating further comprising:

determining an RVE life for each said RVE, said determining an RVE life comprising:

evaluating a statistically determined number of nucleation sites within said RVE utilizing probabilistic methods.

12. The method of claim 1, said identifying further comprising:

obtaining a statistical distribution of said stresses at said significant nodes and said simulating a component life further comprising:

establishing a RVE life for each said RVE using probabilistic methods and said statistical distribution.

13. The method of claim 1, wherein said component has regions of similar geometric detail and said simulating further comprises adding a spatial correlation for said regions.

14. An apparatus for predicting the failure of a component comprising:

a central processing unit (CPU);

an output device for displaying simulated fatigue results;

an input device for receiving input; and a memory comprising:

instructions for receiving input comprising: a component's material characteristics, a Finite Element Model (FEM) of said component, and at least one Representative Volume Element (RVE) microstructure-based failure model;

instructions for predicting failure of said component comprising:

analyzing said FEM to obtain stresses at nodes of said FEM;

identifying a subset of said nodes as significant nodes based on said stresses;

determining an RVE for at least one of said significant nodes;

simulating a component life using at least one RVE microstructure-based failure model, said simulating producing a result related to component life;

performing said simulating a plurality of times to produce results related to component life;

preparing statistics using said results; and comparing said statistics to a probability of failure (POF) criteria to determine whether said performing predicted failure for said component; and instructions for displaying a result from said predicting.

15. The apparatus of claim 14, wherein said failure is due to fatigue.

16. The apparatus of claim 14, wherein each said RVE microstructure-based failure model comprises at least one random variable and wherein probabilistic methods are used to provide values for said at least one random variable.

17. The apparatus of claim 14, wherein said simulating further comprises instructions for:

establishing an RVE life for each said RVE; and using each said RVE life to produce a result related to said component life.

18. The apparatus of claim 14, said simulating further comprising instructions for:

determining an RVE life for each said RVE, said determining an RVE life comprising:

evaluating a statistically determined number of nucleation sites within said RVE utilizing probabilistic methods.

19. The apparatus of claim 14, said identifying further comprising instructions for:

obtaining a statistical distribution of said stresses at said significant nodes and said simulating a component life further comprising:

establishing a RVE life for each said RVE using probabilistic methods and said statistical distribution.

20. The apparatus of claim 14, wherein said component has regions of similar geometric detail and said simulating further comprises instructions for adding a spatial correlation for said regions.

21. The apparatus of claim 14, wherein said RVE microstructure-based failure model comprises:

at least one damage mechanism;

and wherein said at least one damage mechanism includes one of a group of models consisting of: a crack nucleation model, a short crack growth model, and a long crack growth model.

* * * * *